United States Patent
Kanamoto et al.

(10) Patent No.: US 12,073,130 B2
(45) Date of Patent: Aug. 27, 2024

(54) CONTROL APPARATUS HAVING MULTIPLE PRINT SPEEDS, CONTROL METHOD, AND NON-TRANSITORY COMPUTER-READABLE STORAGE MEDIUM STORING PROGRAM

(71) Applicant: CANON KABUSHIKI KAISHA, Tokyo (JP)

(72) Inventors: Yoshiji Kanamoto, Tokyo (JP); Shogo Higashi, Kanagawa (JP); Kazuo Wakai, Tokyo (JP); Koichiro Manabe, Kanagawa (JP); Kosuke Tsujita, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/213,351

(22) Filed: Jun. 23, 2023

(65) Prior Publication Data
US 2024/0012589 A1  Jan. 11, 2024

(30) Foreign Application Priority Data

Jul. 6, 2022 (JP) ................ 2022-109062
Dec. 15, 2022 (JP) ................ 2022-200510

(51) Int. Cl.
G06F 3/12 (2006.01)

(52) U.S. Cl.
CPC .......... *G06F 3/1215* (2013.01); *G06F 3/1237* (2013.01)

(58) Field of Classification Search
CPC .............................. G06F 3/1215; G06F 3/1237
USPC .................................. 358/1.13, 1.9; 399/396
See application file for complete search history.

(56) References Cited

U.S. PATENT DOCUMENTS

2009/0102908 A1* 4/2009 Imoto .................. B41J 11/0024
347/104
2012/0062919 A1* 3/2012 Hashimoto ........... G06F 3/1288
358/1.12

FOREIGN PATENT DOCUMENTS

JP 2019-142163 A 8/2019

OTHER PUBLICATIONS

Shogo Higashi et al., U.S. Appl. No. 18/221,958, filed Jul. 14, 2023.

* cited by examiner

Primary Examiner — Jamares Q Washington
(74) Attorney, Agent, or Firm — VENABLE LLP

(57) ABSTRACT

A control apparatus analyzes a job used to execute print processing and acquires sheet information of a page included in the job, decides a print speed in the print processing based on the acquired information, and executes the print processing using the decided print speed. The sheet information of each of a plurality of pages included in the job is acquired, the print speed is decided based on the acquired information, and the print processing is executed using the decided print speed. Print processing is not executed during the acquisition of the sheet information of each of the plurality of pages.

22 Claims, 19 Drawing Sheets

FIG. 4

| | |
|---|---|
| BOOT LOADER | 401 |
| OPERATING SYSTEM | 402 |
| NETWORK CONTROL PROGRAM | 403 |
| JDF FUNCTION PROGRAM | 404 |
| PDL FUNCTION PROGRAM | 405 |
| MEDIUM MANAGEMENT PROGRAM | 406 |
| SETTING MANAGEMENT PROGRAM | 407 |
| OTHER PROGRAMS | 408 |

FIG. 5

| | |
|---|---|
| BOOT LOADER | 501 |
| OPERATING SYSTEM | 502 |
| NETWORK CONTROL PROGRAM | 503 |
| JOB MANAGEMENT PROGRAM | 504 |
| Pre-RIP PROGRAM | 505 |
| PDL FUNCTION PROGRAM | 506 |
| SCHEDULER PROGRAM | 507 |
| OTHER PROGRAMS | 508 |

FIG. 6A

| 601 | 602 | 603 | 604 | 605 | 606 | 607 |
|---|---|---|---|---|---|---|
| ID | MEDIUM NAME | SIZE | TYPE | BASIS WEIGHT | PRINT SPEED 1 | PRINT SPEED 2 |
| ... | ... | ... | ... | ... | ... | ... |
| 010 | COATED PAPER A | A4 | DOUBLE-SIDE COATED PAPER | 200g | POSSIBLE | POSSIBLE |
| 011 | COATED PAPER B | A4 | DOUBLE-SIDE COATED PAPER | 200g | POSSIBLE | POSSIBLE |
| 012 | COATED PAPER C | A4 | SINGLE-SIDE COATED PAPER | 200g | POSSIBLE | POSSIBLE |
| ... | ... | ... | ... | ... | ... | ... |
| 020 | COATED PAPER X | A4 | DOUBLE-SIDE COATED PAPER | 200g | IMPOSSIBLE | POSSIBLE |
| ... | ... | ... | ... | ... | ... | ... |

| 606 | 607 | 614 |
|---|---|---|
| PRINT SPEED 1 | PRINT SPEED 2 | SWITCHING TIME |
| 100PPM | 75PPM | 30(SEC) |

| PAGE | SHEET ID | SHEET TYPE | |
|---|---|---|---|
| 1 | 011 | COATED PAPER B | |
| 2 | 011 | COATED PAPER B | |
| 3 | 011 | COATED PAPER B | |
| 4 | 011 | COATED PAPER B | 806 |
| ⋮ | ⋮ | ⋮ | |
| 47 | 012 | COATED PAPER C | 807 |
| 48 | 012 | COATED PAPER C | |
| 49 | 020 | COATED PAPER X | 808 |
| 50 | 011 | COATED PAPER B | |
| ⋮ | ⋮ | ⋮ | 806 |
| 100 | 011 | COATED PAPER B | 806 |

| PAGE | SHEET ID | SHEET TYPE | PRINT SPEED 1 | PRINT SPEED 2 |
|---|---|---|---|---|
| 1 | 011 | COATED PAPER B | POSSIBLE | POSSIBLE |
| 2 | 011 | COATED PAPER B | POSSIBLE | POSSIBLE |
| 3 | 011 | COATED PAPER B | POSSIBLE | POSSIBLE |
| 4 | 011 | COATED PAPER B | POSSIBLE | POSSIBLE |
| ⋮ | ⋮ | ⋮ | ⋮ | ⋮ |
| 47 | 012 | COATED PAPER C | POSSIBLE | POSSIBLE |
| 48 | 012 | COATED PAPER C | POSSIBLE | POSSIBLE |
| 49 | 020 | COATED PAPER X | IMPOSSIBLE | POSSIBLE |
| 50 | 011 | COATED PAPER B | POSSIBLE | POSSIBLE |

F I G. 13A

| | |
|---|---|
| PRINT SPEED 1 | 100(min) |
| PRINT SPEED 2 | 75(min) |
| SWITCHING TIME | 30 SEC |
| NUMBER OF ANALYSIS PAGES | 50 PAGES |
| NUMBER OF JOB PAGES | 100 PAGES |
| JOB DATA | FIG. 8 |

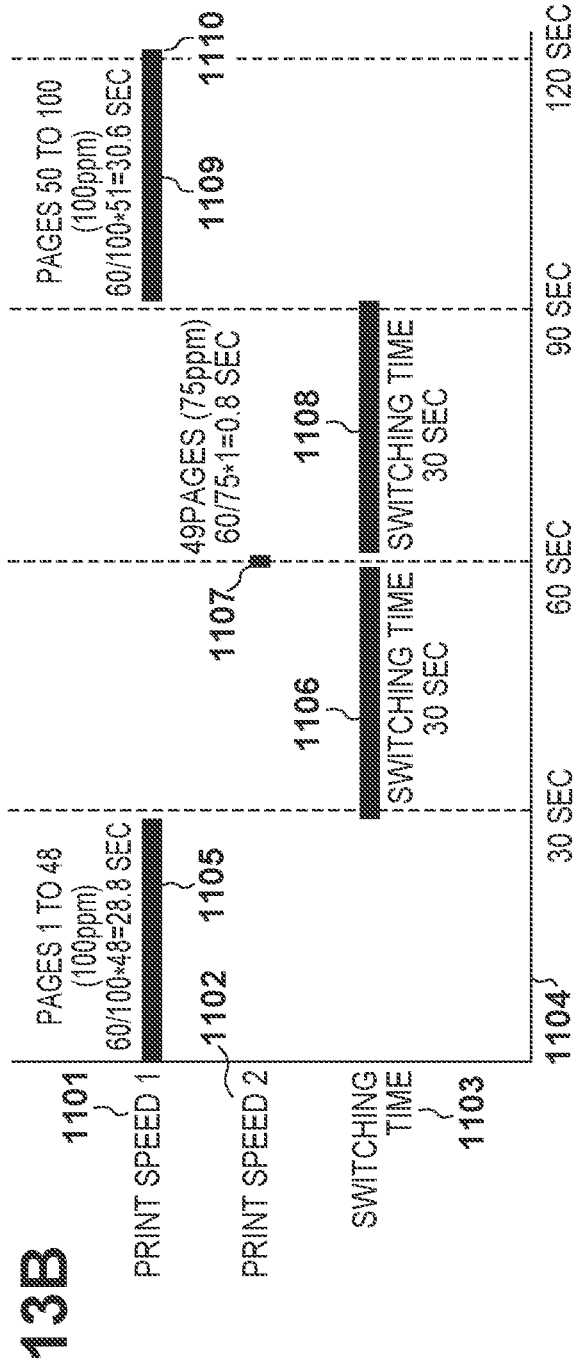
F I G. 13B
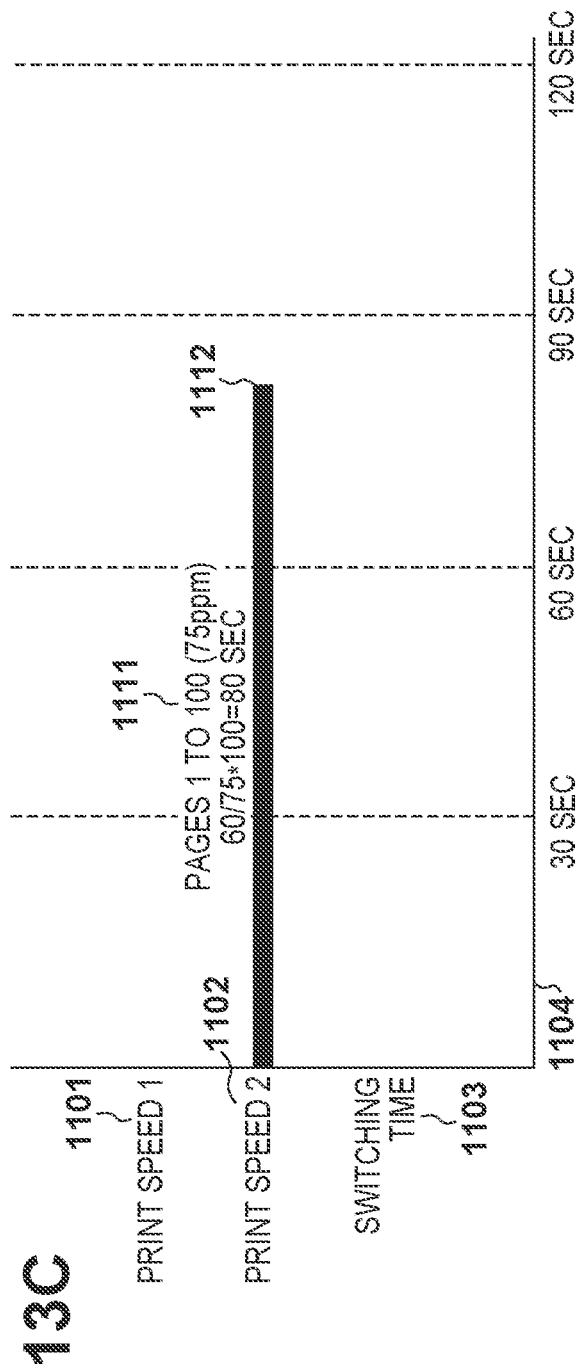
F I G. 13C

FIG. 16

| PRINT SPEED 1 | PRINT SPEED 2 | PRINT SPEED 3 | SWITCHING TIME |
|---|---|---|---|
| 100PPM | 75PPM | 50PPM | 30(SEC) |

FIG. 18B

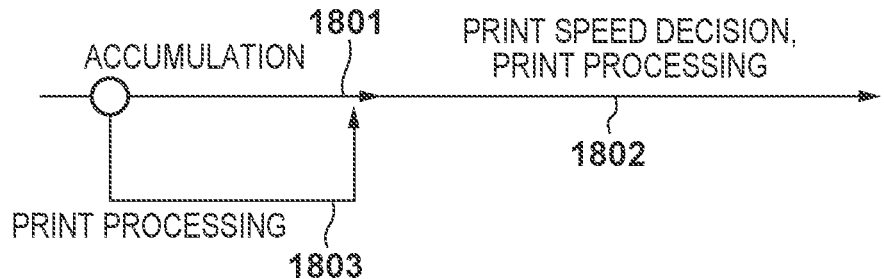

FIG. 19A

| PAGE | SHEET ID | SHEET TYPE | PRINT SPEED 1 | PRINT SPEED 2 | | |
|---|---|---|---|---|---|---|
| 1 | 011 | COATED PAPER B | POSSIBLE | POSSIBLE | ~1901 | |
| 2-49 | 011 | COATED PAPER B | POSSIBLE | POSSIBLE | ~1902 | 1906 |
| 50 | 011 | COATED PAPER B | POSSIBLE | POSSIBLE | ~1903 | |
| 51 | 020 | COATED PAPER X | IMPOSSIBLE | POSSIBLE | ~1904 | |
| 52-100 | 020 | COATED PAPER X | IMPOSSIBLE | POSSIBLE | ~1905 | |

FIG. 19B

| PAGE | SHEET ID | SHEET TYPE | PRINT SPEED 1 | PRINT SPEED 2 | | |
|---|---|---|---|---|---|---|
| 1 | 020 | COATED PAPER X | IMPOSSIBLE | POSSIBLE | ~1911 | |
| 2-49 | 020 | COATED PAPER X | IMPOSSIBLE | POSSIBLE | ~1912 | 1917 |
| 50 | 020 | COATED PAPER X | IMPOSSIBLE | POSSIBLE | ~1913 | |
| 51 | 011 | COATED PAPER B | POSSIBLE | POSSIBLE | ~1914 | |
| 52-100 | 011 | COATED PAPER B | POSSIBLE | POSSIBLE | ~1915 | 1918 |
| 101~ | 011 | COATED PAPER B | POSSIBLE | POSSIBLE | ~1916 | |

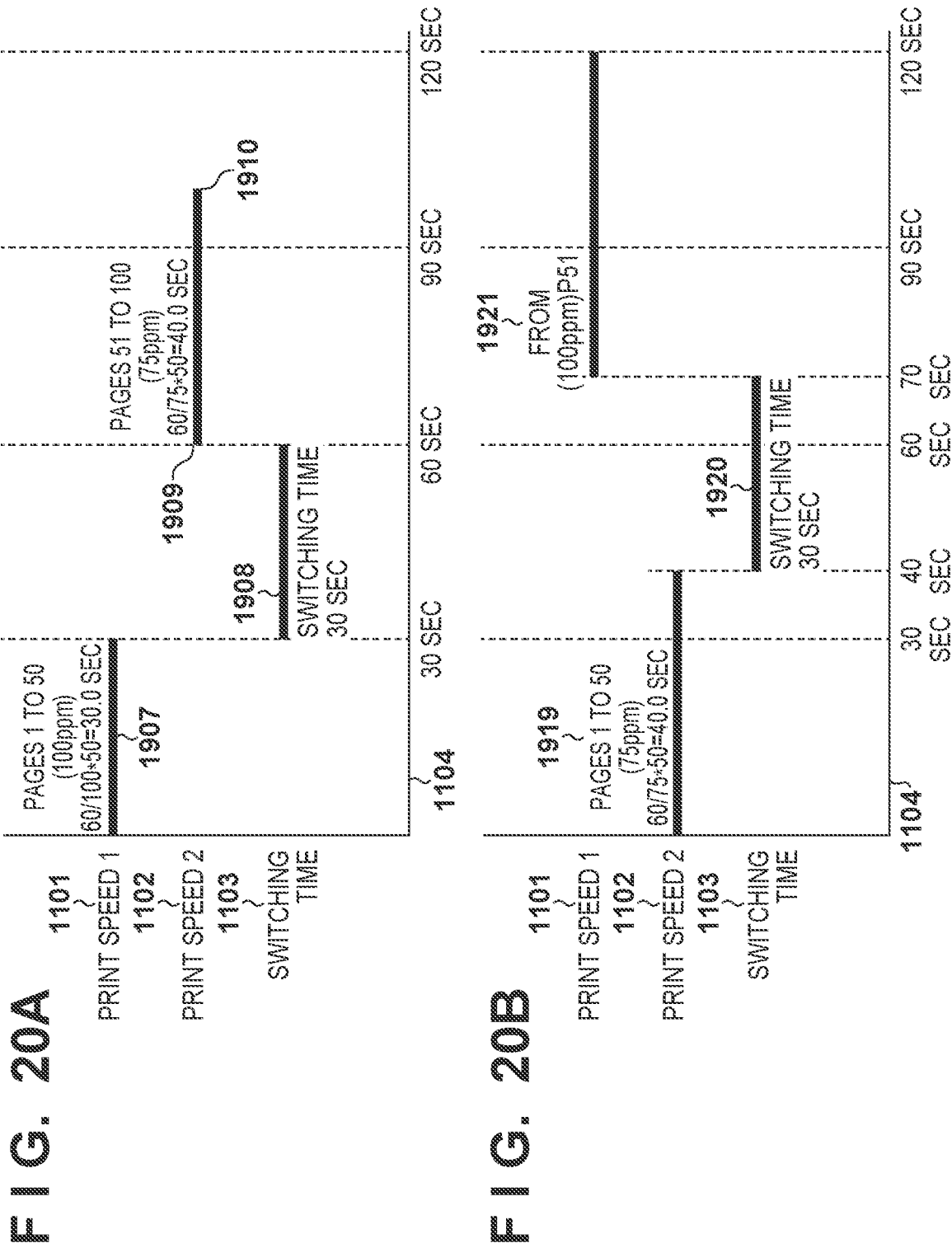

CONTROL APPARATUS HAVING MULTIPLE PRINT SPEEDS, CONTROL METHOD, AND NON-TRANSITORY COMPUTER-READABLE STORAGE MEDIUM STORING PROGRAM

BACKGROUND OF THE INVENTION

Field of the Invention

The present invention relates to a control apparatus having a plurality of print speed modes, a control method, and a non-transitory computer-readable storage medium storing a program.

Description of the Related Art

There is conventionally known an image forming apparatus (also called a Multi Function Peripheral (MFP)) having a plurality of print speed modes. As an example, in a case of plain paper, print control in a high-speed print mode is executed. If the paper type is thick paper or coated paper, print control in a low-speed print mode is executed. The MFP supports a variety of sheet types, and can perform various kinds of print processing and working processing using the various types of sheets.

SUMMARY OF THE INVENTION

The present invention provides a control apparatus that improves the productivity of printing by executing a job with a mixture of sheet types, a control method, and a non-transitory computer-readable storage medium storing a program.

The present invention in one aspect provides a control apparatus comprising: an acquisition unit configured to analyze a job used to execute print processing and acquire sheet information of a page included in the job; and a control unit configured to decide a print speed in the print processing based on a acquired by the acquisition unit and execute the print processing using the decided print speed, wherein the control unit causes the acquisition unit to acquire the sheet information of each of a predetermined number of pages of a plurality of pages included in the job, accumulates the sheet information in a storage unit, decides the print speed based on the accumulated result, and executes the print processing using the decided print speed.

According to the present invention, it is possible to improve the productivity of printing by executing a job with a mixture of sheet types.

Further features of the present invention will become apparent from the following description of exemplary embodiments with reference to the attached drawings.

BRIEF DESCRIPTION OF THE DRAWINGS

FIG. 4 is a view showing the configuration of the programs of the MFP;

FIG. 5 is a view showing the configuration of the programs of the DFE;

FIGS. 6A and 6B are views showing a medium database;

FIGS. 13A to 13C are views for explaining effects in an operation according to the embodiment;

FIG. 16 is a view showing a print speed table;

FIGS. 18A and 18B are views for explaining the operation according to the embodiment;

FIGS. 19A and 19B are views showing job page data;

FIGS. 20A and 20B are views for explaining effects in the operation according to the embodiment.

DESCRIPTION OF THE EMBODIMENTS

Figure 1:
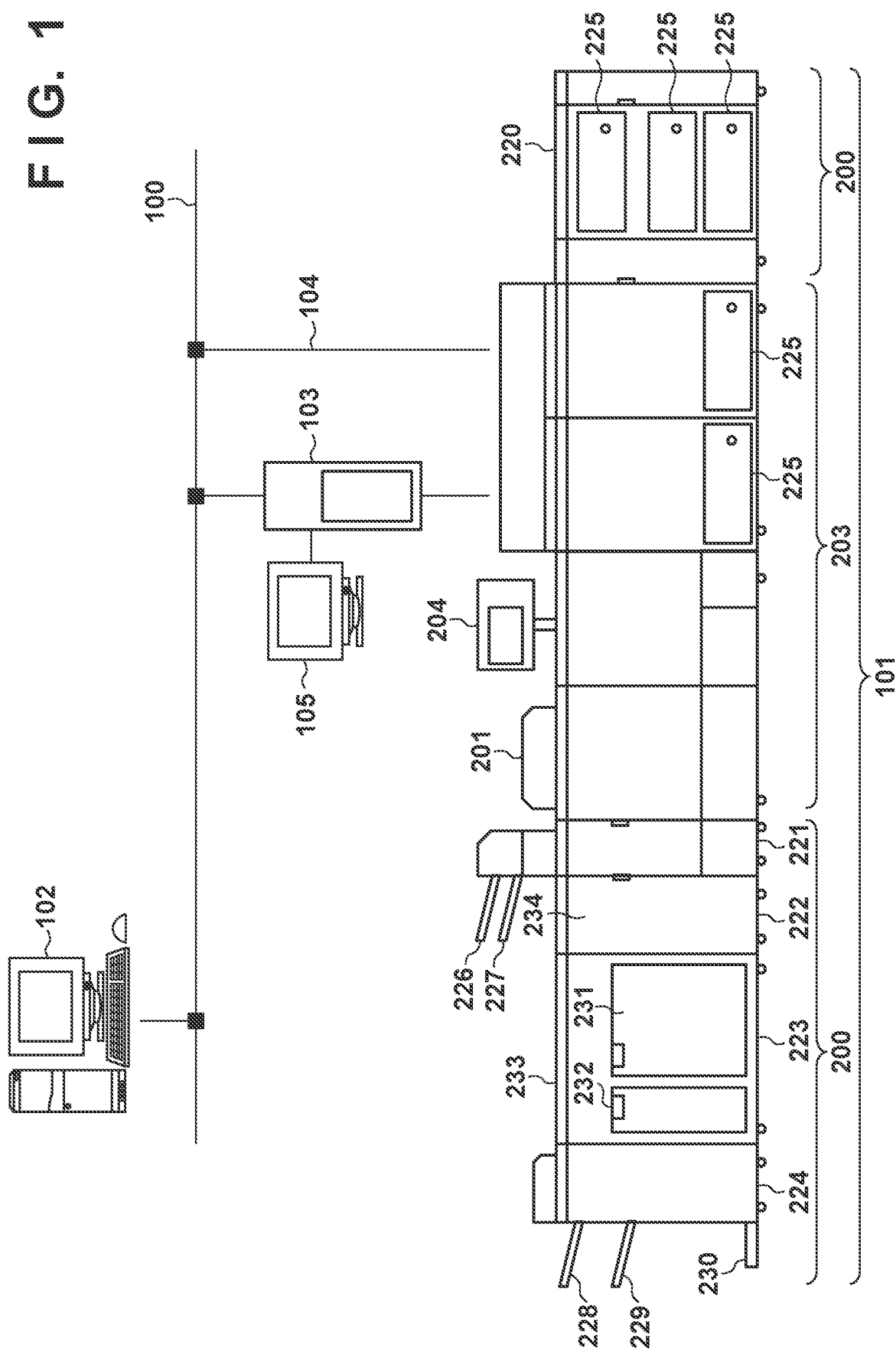
FIG. 1 is a block diagram showing a print processing system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

An image forming apparatus has a plurality of print speed modes, and selects an appropriate speed in accordance with the sheet type of a processing target and performs control. If switching of the print speed occurs, a predetermined time is required for the switching processing, and the productivity of job execution is demanded to be improved.

Japanese Patent Laid-Open No. 2019-142163 describes preventing print productivity from lowering by changing the order of jobs to be processed. In Japanese Patent Laid-Open No. 2019-142163, however, improving the productivity of job execution with a mixture of sheet types is not mentioned.

According to the present disclosure, it is possible to improve productivity of printing by executing a job with a mixture of sheet types.

First Embodiment

FIG. 1 is a block diagram showing an example of a print processing system according to this embodiment. In this embodiment, a Multifunction Peripheral (MFP) 101 will be described as an example of an image forming apparatus. Also, a PC 102 will be described as an example of an information processing apparatus. The MFP 101 and the PC 102 are connected via a network 100 to be communicable with each other.

Note that FIG. 1 shows a case where one information processing apparatus is provided in the print processing system. However, the MFP 101 and a plurality of information processing apparatuses may be connected via the network 100 to be communicable. In addition, FIG. 1 shows a case where the print processing system includes an image forming apparatus and an information processing apparatus. However, the present invention is not limited to this. For example, the image forming apparatus may be the print processing system. When executing image formation processing executable by the MFP 101 alone, for example, printing of a copy job or a saving job, the information processing apparatus may not be connected to the network 100.

The PC 102 will be described first. The PC 102 can execute various kinds of programs such as an application program configured to submit a print job. In addition, a printer driver that has a function of converting data into a printer language corresponding to the MFP 101 and various kinds of applications such as workflow software are installed in the PC 102. A user who wants to print can input a print instruction from the various kinds of application. The various kinds of applications can each convert data to be output from the application based on a print instruction into data interpretable by the MFP 101 and transmit the data to the MFP 101.

Note that in this embodiment, a PC is shown as an example of the information processing apparatus. However, the information processing apparatus may be, for example, a portable information terminal such as a smartphone or a tablet terminal. Note that a configuration for transmitting the above-described converted data to the image forming apparatus can be implemented by various methods. For example, the information processing apparatus may transmit the converted data to the image forming apparatus via a print application or a printer driver, or may transmit the converted data to the image forming apparatus via a cloud server.

The MFP 101 will be described next. The MFP 101 has a reading function of optically reading an image on an original and a print function of printing the image on a print medium such as a sheet. In addition, the MFP 101 has a post-processing function of binding a plurality of sheets with images printed thereon, aligning a plurality of sheets, or dividing the discharge destination of a plurality of sheets to a plurality of trays. Note that the sheets include paper such as plain paper, thick paper, and coated paper, a film, and the like.

Note that in this embodiment, the MFP 101 is shown as an example of the image forming apparatus. However, the image forming apparatus may be, for example, a printer that does not have the reading function. In this embodiment, as an example, the image forming apparatus is assumed to include various kinds of components to be described below.

A Digital Front End (DFE) 103 is an apparatus that mainly processes print job data input to the MFP 101. More specifically, the DFE 103 functions as a kind of server apparatus for performing correction and editing of print job data input from the PC 102 or the like, high-speed RIP processing, and storage/management of print job data. The functions of the DFE 103 may be implemented as some of functions provided in the main body of the MFP 101. That is, the MFP 101 itself may provide the functions of the DFE 103 to an external apparatus. In this case, when viewed from the PC 102, it can be considered that the DFE 103 substitutionally provides the functions of the MFP 101 via the network 100. In the DFE 103, various kinds of input/output apparatuses that are the same as those provided in the PC 102, such as a monitor 105, may be formed. Even in this case, the MFP 101 may be directly connected to the network 100 via a network cable 104.

The MFP 101 is configured to perform various kinds of sheet processing by connecting a plurality of apparatuses having different roles to each other. Each part of the MFP 101 will be described below.

Based on image data, a printer unit 203 forms (prints) an image on a sheet fed from a paper feeding unit using toner. The configuration and operation principle of the printer unit 203 are as follows. A light beam such as a laser beam modulated in accordance with image data is reflected by a rotating polyhedral mirror (polygon mirror or the like), and a photosensitive drum is irradiated with the scan light. An electrostatic latent image formed on the photosensitive drum by the laser beam is developed by toner, and a toner image is transferred to a sheet attached to a transfer drum. The series of image forming processes is sequentially executed for yellow (Y), magenta (M), cyan (C), and black (K) toners, thereby forming a full-color image on the sheet. In addition to the four colors, a toner called a spot color or a transparent toner may be transferred. The sheet on the transfer drum, on which the full-color image is formed, is conveyed to a fixing unit. The fixing unit includes a roller, a belt, and the like. The roller incorporates a heat source such as a halogen heater, and the toners on the sheet with the toner image transferred thereon are melted and fixed to the sheet by heat and pressure.

According to the sheet type or the basis weight used at the time of print processing by the MFP 101, an appropriate print speed is selected in printing of the printer unit 203. Since fixing processing is limited by the print speed, switching processing of the print speed is needed in accordance with the sheet type or the basis weight. More specifically, as the switching processing of the print speed, change of the fixing temperature of the image forming unit or various kinds of adjustments in the change of the print speed are executed. Note that the printer unit 203 of the MFP 101 is provided with a scanner 201 and an operation unit 204 arranged on the upper surface of the printer unit 203. The operation unit 204 provides various kinds of interface screens when the user performs various kinds of settings and operations of the printer unit 203.

A large-capacity paper feeding apparatus 220 is a paper feeding apparatus detachably attached to the printer unit 203. The paper feeding apparatus includes a plurality of paper feeding units 225. With this configuration, the printer unit 203 can perform print processing for an enormous number of sheets. An inserter 221 is an apparatus used to insert a sheet without image formation into a product of sheets processed by the printer unit 203. FIG. 1 shows a form in which two trays 226 and 227 are provided.

A punching apparatus 222 is an apparatus aiming at performing working processing such as punching for a sheet supplied from the printer unit 203 or the inserter 221. For example, the apparatus shown in FIG. 1 is configured such that an internal component called a die can be exchanged. For this purpose, a door 234 used to exchange the die is provided.

A bookbinding apparatus 223 is an apparatus configured to execute bookbinding processing. More specifically, the bookbinding apparatus 223 is an apparatus aiming at making a binding member pass through a hole portion of a sheet that has undergone the punching by the punching apparatus 222 and then deforming the binding member, thereby obtaining a sheet bundle, that is, a bookbinding product. The created bookbinding product is stacked on a tray arranged inside a bookbinding door 231. In addition, a door 232 that can be opened/closed when replenishing binding members is formed. Furthermore, a door 233 is formed such that the user can access a sheet conveyance path in the apparatus when, for example, a jam occurs in the apparatus.

A working apparatus 224 is an apparatus configured to perform needle binding for a plurality of sheet bundles. As the needle binding, binding processing in a form desired by the user, for example, corner stitching, two-spot stitching, or saddle stitching can be performed. In corner stitching or two-spot stitching, a processed product is discharged by trays 228 and 229. On the other hand, in saddle stitching, a processed product is discharged to a tray 230.

The MFP 101 can roughly be divided into three parts with respect to the printer unit 203 as the boundary. Referring to FIG. 1, the device arranged on the right side of the printer unit 203 is called a paper feeding system apparatus. The paper feeding system apparatus mainly continuously supplies sheets loaded inside to the printer unit 203 at an appropriate timing. The apparatus also performs detection of the remaining quantity of sheets loaded inside. The paper feeding units 225 in the printer unit 203 can execute the same function as the paper feeding system apparatus. The paper feeding units provided in the printer unit 203 are also called paper feeding system apparatuses for the descriptive convenience. On the other hand, referring to FIG. 1, a device arranged on the left side of the printer unit 203 is called a sheet working apparatus. This is also called a sheet processing apparatus or a post-processing apparatus. The sheet working apparatus applies various kinds of working processing for sheets that have undergone print processing, or perform processing such as accumulation. The above-described paper feeding system apparatuses and the sheet working apparatus will collectively be referred to as a sheet processing apparatus 200 hereinafter.

Figure 2:
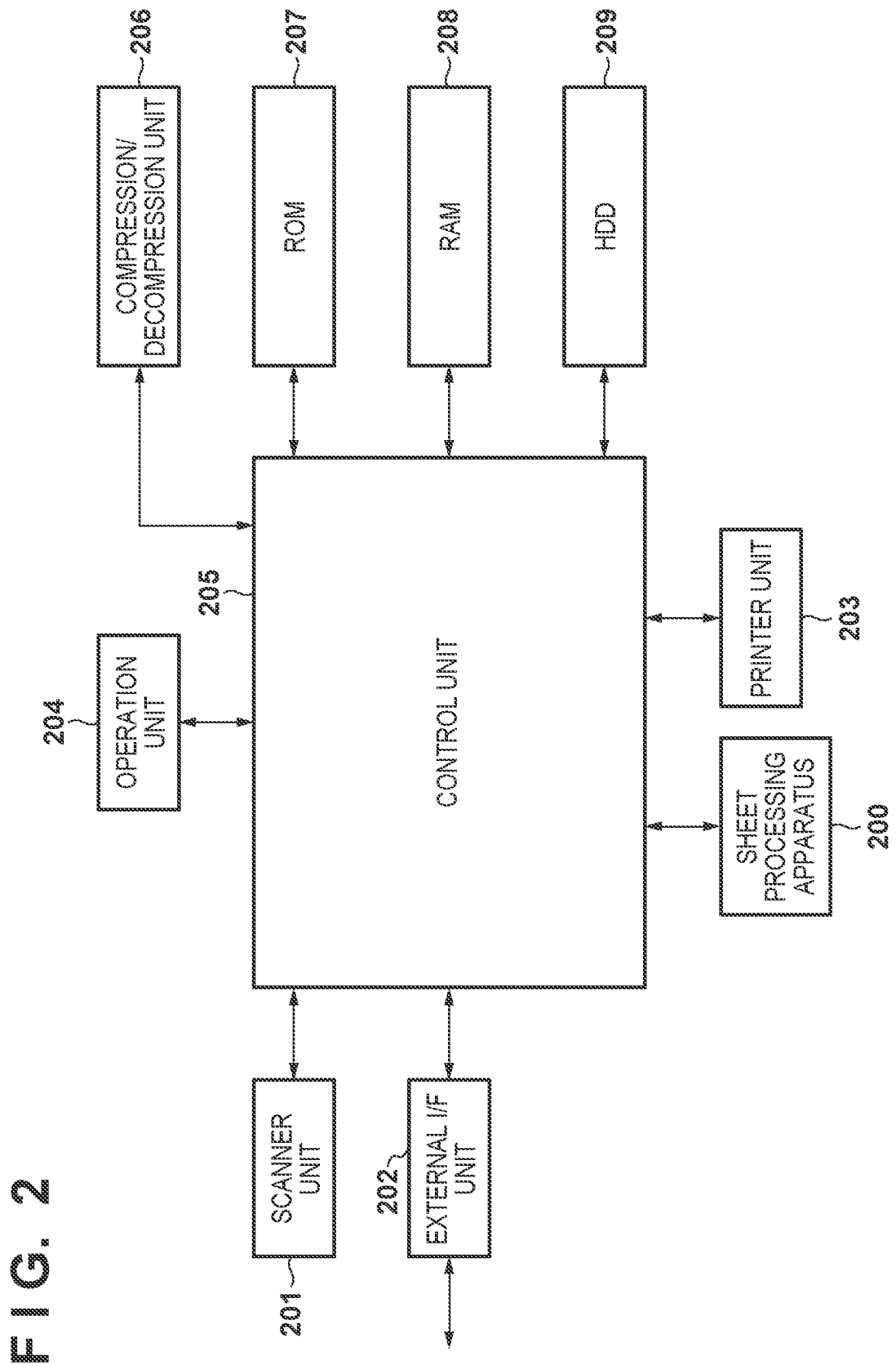
FIG. 2 is a block diagram showing the configuration of an MFP.

The functional configuration of the MFP 101 according to this embodiment will be described next. FIG. 2 is a block diagram showing an example of the functional configuration of the MFP 101.

The MFP 101 includes a nonvolatile memory such as a hard disk 209 (to be referred to as an HDD hereinafter) capable of storing data of a plurality of jobs as a processing target. Note that in this embodiment, an example of the MFP 101 using a hard disk is shown. However, the memory is not limited to a hard disk if it is a large-capacity nonvolatile storage device.

Also, the MFP 101 has a copy function of storing, in the HDD 209, data accepted from the scanner 201, reading out the data from the HDD 209, and printing it by the printer unit 203. The MFP 101 also has a print function of storing, in the HDD 209, print job data received from an external apparatus via an external I/F unit 202, reading out the data from the HDD 209, and printing it by the printer unit 203. The MFP 101 is a Multifunction Peripheral (MFP) having such a plurality of functions. Note that the print function of the MFP 101 can be any of a color print function and a monochrome print function.

The scanner 201 optically reads an original image, processes image data obtained by reading the original, and outputs the image data. The external I/F unit 202 transmits/receives image data and the like to/from a facsimile apparatus, a network connection device, or an external dedicated apparatus. The HDD 209 stores various kinds of management information to be stored, changed, and managed by the MFP 101 as well. The MFP 101 includes the printer unit 203 that executes print processing of print job data stored in the HDD 209. The MFP 101 includes the operation unit 204 with a display unit. A controller unit (control unit) 205 provided in the MFP 101 includes a CPU (not shown), and comprehensively controls processing and operations of various kinds of units in the MFP 101. A ROM 207 stores various kinds of programs and data. For example, programs to be executed by the controller unit 205 to execute the processing of flowcharts to be described later are stored. The ROM 207 also stores a display control program configured to display, including a user interface screen (to be referred to as a UI screen hereinafter), various kinds of UI screens on the display unit of the operation unit 204.

The CPU of the controller unit 205 reads out a program stored in the ROM 207 and executes it, thereby causing the MFP 101 to execute various kinds of operations in this embodiment. The ROM 207 also stores a program to be executed by the controller unit 205 to perform an operation of interpreting page description language (to be abbreviated as PDL hereinafter) data received from an external apparatus via the external I/F 202 and rasterizing the data into raster image data (bitmap image data). Similarly, the ROM 207 stores a program to be executed by the controller unit 205 to interpret and process a print job received from an external apparatus via the external I/F 202. These are processed by software. The ROM 207 is a read only memory and stores programs such as a boot sequence and font information and various kinds of programs such as the above-described programs in advance. Details of the various kinds of programs stored in the ROM 207 will be described later. A RAM 208 is a readable/writable memory and stores image data sent from the scanner 201 or the external I/F 202, various kinds of programs, and setting information. Also, the controller unit 205 controls the operation of the sheet processing apparatus 200. The sheet processing apparatus 200 corresponds to the paper feeding system apparatuses and the sheet working apparatus described with reference to FIG. 1.

The HDD 209 also stores image data compressed by a compression/decompression unit 206. The HDD 209 is configured to hold print job data of a processing target. The controller unit 205 stores, in the HDD 209, print job data of a processing target input via various kinds of input units such as the scanner 201 and the external I/F 202, reads out the print job data from the HDD 209, and outputs the data to the printer unit 203 to cause it to execute printing. In addition, the controller unit 205 controls to transmit the print job data read out from the HDD 209 to an external apparatus via the external I/F 202. Thus, the controller unit 205 can execute various kinds of output processing for print job data of a processing target stored in the HDD 209. The compression/decompression unit 206 performs compression/decompression processing of image data stored in the RAM 208 or the HDD 209 using various kinds of compression methods such as JBIG and JPEG.

Figure 3:
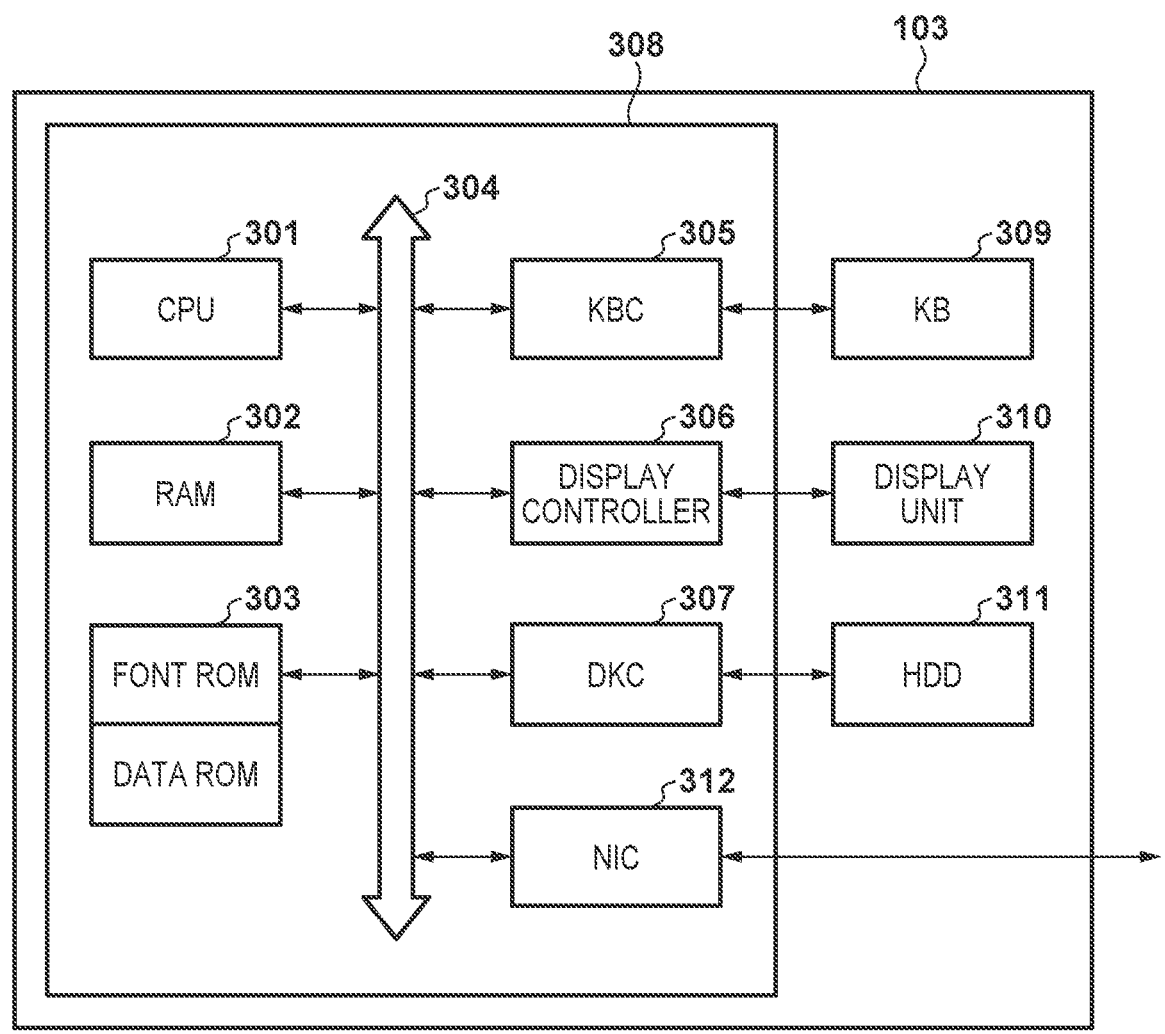
FIG. 3 is a block diagram showing the configuration of a DFE.

FIG. 3 is a block diagram showing an example of the configuration of the DFE 103. Referring to FIG. 3, a CPU 301 provided in a controller unit 308 executes programs such as an OS, general applications, and bookbinding applications stored in the program ROM of a ROM 303 or loaded from an HDD 311 into a RAM 302. The ROM 303 is used as a font ROM and a data ROM. The RAM 302 functions as the main memory, work area, and the like of the CPU 301. A keyboard controller (KBC) 305 controls input from a keyboard 309 or a pointing device (not shown). A display controller 306 controls display on a display unit 310. A disk controller (DKC) 307 controls access to the HDD 311 and the like, which store boot program, various applications, font data, and user files. A network controller (NC) 312 executes communication control processing to other devices connected to the network 100. A bus 304 connects the CPU 301, the RAM 302, the ROM 303, and various kinds of controllers and conveys data signals and control signals.

FIG. 4 is a view showing an example of the configuration of the programs of the MFP 101. The programs shown in FIG. 4 are stored in the ROM 207 and read out and executed by the controller unit 205 of the MFP 101.

A boot loader 401 is a program executed immediately after the MFP 101 is powered on. This program includes a program configured to execute various kinds of activation sequences necessary for activation of the system. An operating system 402 is a program aiming at providing an execution environment for various kinds of programs for implementing the functions of the MFP 101. This program mainly provides the functions of resource management of the memories of the MFP 101, that is, the ROM 207, the RAM 208, and the HDD 209 and basic input/output control of the units shown in FIG. 2.

A network control program 403 is a program executed when transmitting/receiving data to/from a device connected via the network. This program is used at the time of processing of receiving a file to be printed, data transmission from an external apparatus, and transmission/reception of a command. The network control program includes a device driver program configured to control the external I/F 202.

A Job Definition Format (JDF) function program 404 is a program that executes a JDF print function in a case where JDF job data is received via the external I/F 202. In the JDF print function, the controller unit 205 sequentially instructs the operations of the units shown in FIG. 2 in an appropriate order based on a processing order and processing conditions described in the JDF function program 404. As a result, control is performed to finally execute JDF print processing. Note that the units to be controlled include the sheet processing apparatus 200, the printer unit 203, the HDD 209, the compression/decompression unit 206, and the RAM 208. In addition, analysis processing of JDF job data received via the external I/F 202, processing of discriminating whether an incorrect setting is included in the JDF as the result of analysis processing, and processing of performing setting change to eliminate the incorrect setting are executed.

A PDF function program 405 is a program that executes PDL data expansion processing and print processing in a case where PDL data (image data of a processing target) is received via the external I/F 202. In the PDL function, the controller unit 205 sequentially instructs the operations of the units shown in FIG. 2 in an appropriate order based on a processing order and processing conditions described in the PDF function program 405. As a result, control is performed to finally execute PDL print processing. Note that the units to be controlled include the sheet processing apparatus 200, the printer unit 203, the HDD 209, the compression/decompression unit 206, and the RAM 208. In addition, the PDF function program 405 is configured to operate together with the JDF function program 404 to analyze various kinds of job setting formats at the time of print processing execution.

A medium management program 406 is a program configured to execute a management function associated with sheets usable by the MFP 101. Sheet associated information managed by the medium management program 406 is stored in the HDD 209. The medium management program 406 provides medium management functions such as registration of a new medium and deletion of an unnecessary medium. The medium management program 406 also has a function of changing the settings of a registered medium or adjusting an unadjusted medium and reregistering it as an adjusted medium. The medium management program 406 also has a management function of exporting medium information to, for example, the PC 102 that is an external apparatus of the MFP 101 via the external I/F 202 or importing medium information from the PC 102. As the sheet associated information managed by the medium management program 406, the information of the print speed applicable at the time printing is also managed in linkage.

The JDF function program 404 and the PDF function program 405 are configured to, in synchronism with the medium management program 406, discriminate the type of a medium and print conditions to be used in print processing of page data of a print target and execute selection and control of an appropriate print speed. Details of selection and control of a print speed will be described later.

A setting management program 407 is a program configured to do various kinds of settings of the apparatus of the MFP 101. An instruction to the setting management program 407 is done via the operation unit 204. An instruction to the setting management program 407 may be executed remotely from an external system such as the PC 102 or the DFE 103 via the external I/F 202. "Other programs" 408 is a generic term for programs that are not included in the above-described programs among the programs stored in the ROM 207 and executable by the MFP 101.

FIG. 5 is a view showing an example of the configuration of the programs of the DFE 103. The programs shown in FIG. 5 are stored in the ROM 303 and read out and executed by the CPU 301 of the DFE 103.

A boot loader 501 is a program executed immediately after the DFE 103 is powered on. This program includes a program configured to execute various kinds of activation sequences necessary for activation of the system. An operating system 502 is a program aiming at providing an execution environment for various kinds of programs for implementing the functions of the DFE 103. This operating system 502 provides the function of resource management of the memories of the apparatus, that is, the ROM 303, the RAM 302, and the HDD 311.

A network control program 503 is a program executed when transmitting/receiving data to/from a device connected via the network. That is, the program is used when transmitting print job data to the MFP 101 and instructing print processing. Also, the network control program 503 is used to receive, from an external apparatus such as the PC 102, data to be used for printing or transmit status information.

A job management program 504 is a program configured to manage a job transmitted from the DFE 103 to the MFP 101. The job management program 504 can manage a job list in the order of transmission and execute processing such as change of the job order, and pause of a job, cancel, and setting change. If the DFE 103 receives a print job from the PC 102 that is an external apparatus, the job management program 504 operates in cooperation with a PDF function program 506, a scheduler program 507, and a Pre-RIP program 505 to be described later and performs a series of job management and job execution control as the DFE 103. The Pre-RIP program 505 is a program configured to, when the DFE 103 receives print job data from the PC 102 via the network control program 503, analyze the configuration information of the received print job data. More specifically, the Pre-RIP program 505 collects the number of pages and the page size of print job data, sheet information of each page, and various kinds of setting information and transmits these to the job management program 504.

The PDF function program 506 is a program configured to execute print job data expansion processing that is executed when the DFE 103 receives print job data from the PC 102 via the network control program 503. The expanded data is converted into a format suitable for printing and transmitted to the MFP 101 via the network control program 503. Thus, the MFP 101 is instructed to execute print processing.

The scheduler program 507 is a program provided aiming at presenting information about the progress state of each job registered in the job management program 504. The required time of a job or a time when paper runout will occur can be displayed on the display unit 310 in time series. Hence, the user of the MFP 101 and the DFE 103 can efficiently execute paper replenishment and can also make a production plan and execute generation of a product. "Other programs" 508 is a generic term for programs that are not included in the above-described programs among the programs provided in the DFE 103.

FIGS. 6A and 6B are views showing examples of a medium database and a print speed management table, which are managed by the medium management program 406 shown in FIG. 4 and stored in the HDD 209.

An ID field 601 in FIG. 6A is an internal ID that is uniquely decided in the MFP 101 concerning all medium entries stored in the medium database. A medium name field 602, a medium size field 603, a medium type field 604, and a basis weight field 605 are medium associated parameters of the medium database.

A print speed field 606 shows applicability of a print speed (print speed 1) in a high-speed speed mode of a plurality of print speed modes provided in the MFP 101. A print speed field 607 shows applicability of a print speed (print speed 2) in a low-speed speed mode of the plurality of print speed modes provided in the MFP 101. Based on the information stored in the print speed field 606 and the print speed field 607, executability of print processing at each print speed is determined for each medium managed by the medium database. Note that the information stored in the print speed field 606 and the print speed field 607 may be edited or created by the operator of the MFP 101. Alternatively, the provider (manufacturer) of the MFP 101 may provide the information permanently as a part of product specifications.

FIG. 6A shows detailed cases of four registered sheets. More specifically, as shown in FIG. 6A, coated paper A 608, coated paper B 609, coated paper C 610, and coated paper X 611 are shown as an example. FIG. 6A shows an example in which the medium size field 603, the medium type field 604, and the basis weight field 605 hold the same values for the coated paper A 608, the coated paper B 609, and the coated paper X 611. In other words, for the MFP 101, the three specific media shown in FIG. 6A are equivalent in terms of characteristics.

In this embodiment, values in the print speed field 606 and the print speed field 607 in FIG. 6A are determined. In the example shown in FIG. 6A, it is determined that print speed 2 can be applied to all the coated paper A 608, the coated paper B 609, the coated paper C 610, and the coated paper X 611. On the other hand, as for print speed 1, it is determined that print speed 1 can be applied to the coated paper A 608, the coated paper B 609, and the coated paper C 610 but not to the coated paper X 611.

In this embodiment, even if the medium name field 602 to the basis weight field 605 have the same values for a plurality of medium types, when executing a print job with a mixture of medium types, flexible control of the print speed can be implemented.

FIG. 6B is a view showing an example of information stored in a print speed management table managed by the medium management program 406. As shown in FIG. 6B, the print speed field 606 represents print speed 1, and as an example of print speed 1, 100 PPM (page per minute: the number of pages printable per minute) is stored. The print speed field 607 represents print speed 2, and as an example of print speed 2, 75 PPM is stored. In a switching time field 614 required for switching between print speed 1 and print speed 2, "30 sec" is stored in association as an example.

Figure 7:
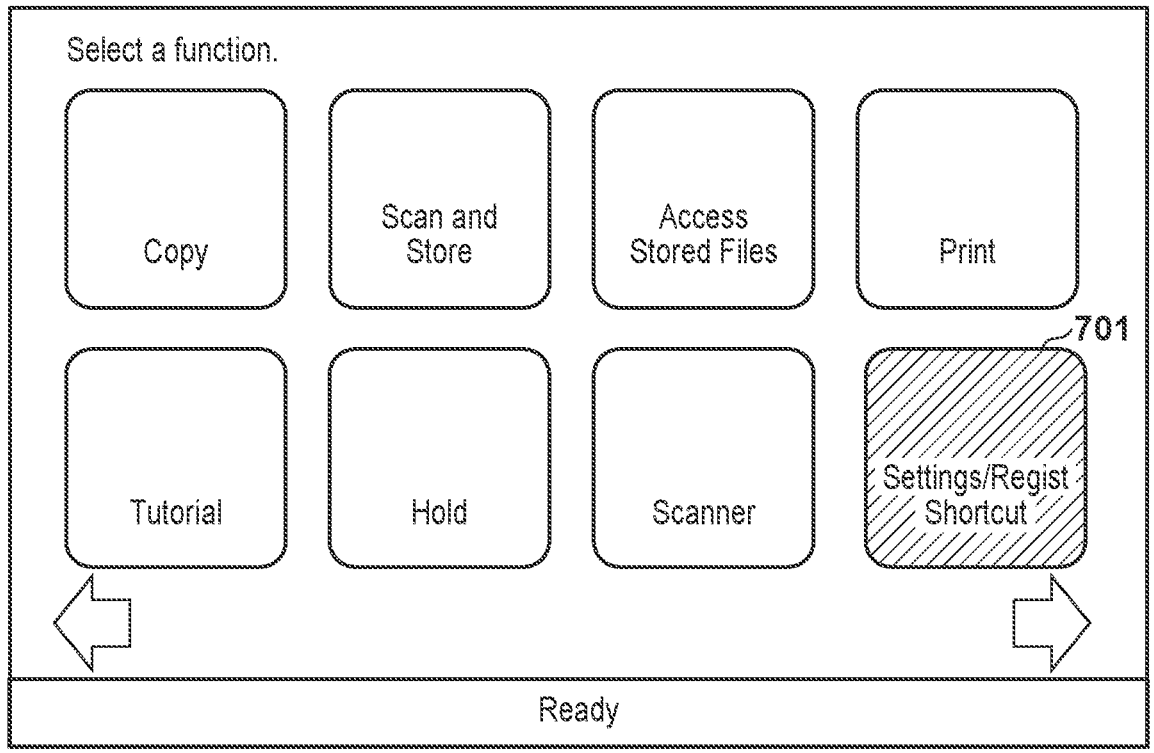
FIG. 7 is a view showing a setting screen.
Figure 8:
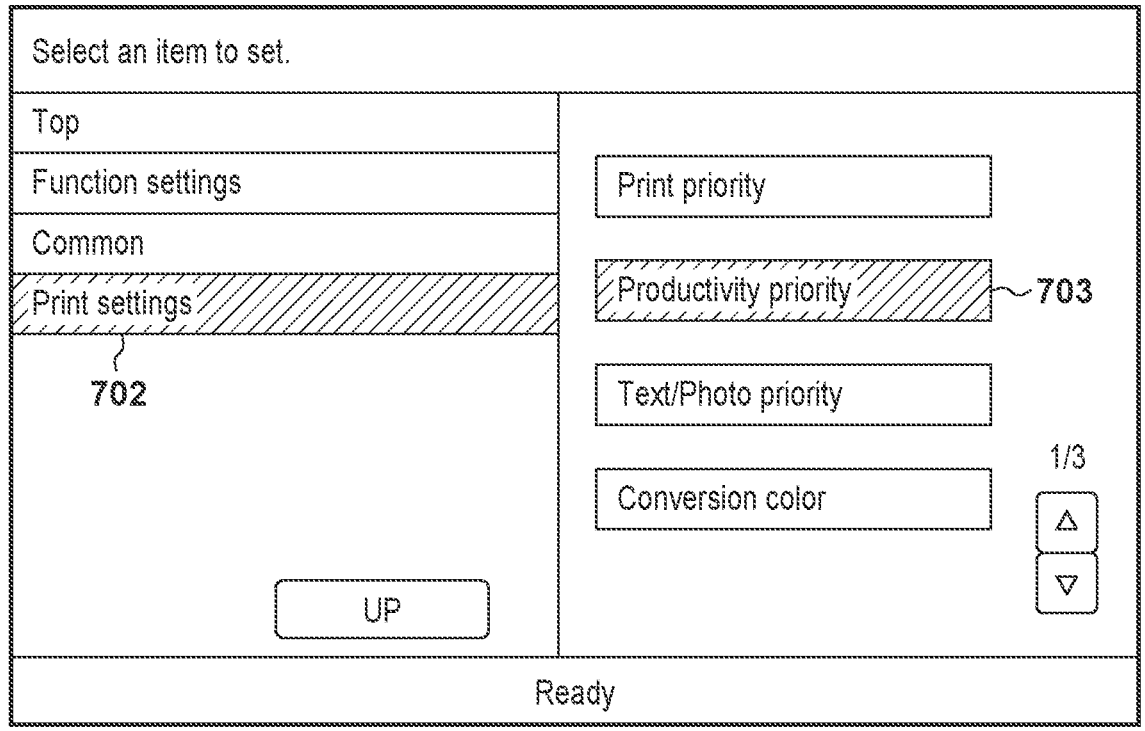
FIG. 8 is a view showing a setting screen.
Figure 9:
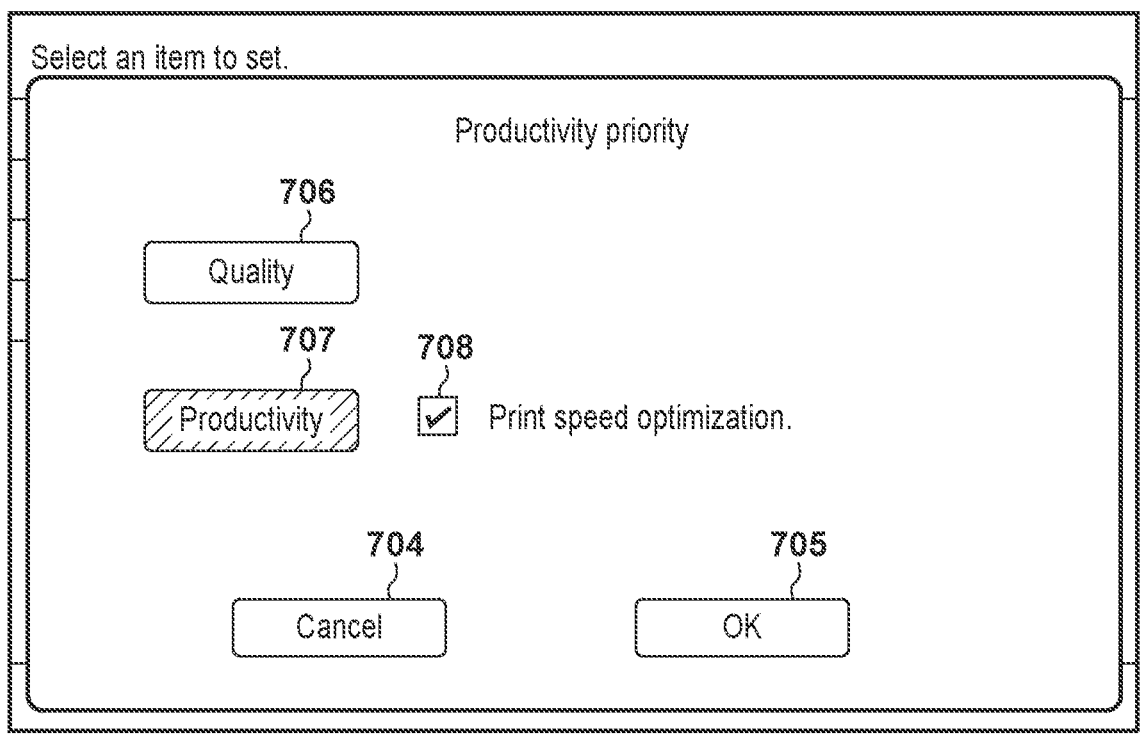
FIG. 9 is a view showing a setting screen.

FIGS. 7, 8, and 9 are views showing examples of print speed mode setting screens displayed on the operation unit 204 of the MFP 101.

FIG. 7 shows an example of a basic screen displayed on the operation unit 204 of the MFP 101. As shown in FIG. 4, the MFP 101 includes various kinds of programs. FIG. 7 shows a state in which a setting portion 701 is selected. The setting portion 701 is an item provided to set various kinds of default operations and the management function of the MFP 101, and is an item used to instruct execution of the setting management program 407.

FIG. 8 is a view showing an example of setting items to transition after the setting portion 701 is selected. The transition to the screen shown in FIG. 8 and display processing of various kinds of setting instructions are implemented by the controller unit 205 executing the setting management program 407. FIG. 8 shows a state in which a print setting portion 702 is selected. Also, FIG. 8 shows a state in which a productivity setting portion 703 is selected as an example of detailed items of the print setting portion 702.

FIG. 9 is a view showing an example of a screen to transition after the productivity setting portion 703 is selected. When a quality designation portion 706 is selected, a print speed mode of the lowest speed in at least one or more print speed modes is selected as a print speed mode applied in print processing of a sheet and applied at the time of print processing. When a productivity designation portion 707 is selected, a print speed mode of the highest speed in at least one or more print speed modes is selected as a print speed mode applied in print processing of a sheet and applied at the time of print processing.

An optimization designation portion 708 is selected when executing optimization processing of the print speed in a state in which the productivity designation portion 707 is selected. In the optimization processing of the print speed, if it is determined that switching of the print speed mode is necessary, to suppress the occurrence of switching of the print speed, the print speed mode is automatically determined based on sheet information of a predetermined number of pages analyzed from the top of print job data.

An operation after execution of a print job is instructed from the DFE 103 will be described below. Upon receiving a print job, the MFP 101 expands print job data to generate page data that is a target of print processing. This operation is implemented by the controller unit 205 reading out and executing the PDF function program 405. At the same time as the page data generation, the sheet information of sheets to be used in printing is acquired.

The PDF function program 405 executes expansion processing sequentially from the top page of the data forming the print job, and printable page data is stored in the HDD 209 of the MFP 101. If the optimization designation portion 708 is not selected, for the page data stored in the HDD 209, print processing is quickly executed by the PDF function program 405 and the controller unit 205. At this time, the print speed mode to be applied at the time of printing is selected based on the print speeds in the print speed field 606 and the print speed field 607 of the medium database shown in FIG. 6A managed by the medium management program 406 based on the acquired sheet information.

However, if the optimization designation portion 708 is selected, and sheet types are mixed in the job, switching processing of the print speed is needed because sheets of the sheet types of the mixture cannot be processed at a single print speed. As a result, production is temporarily interrupted such that the MFP 101 performs switching processing of the print speed at the boundary of pages of the mixture of sheet types. As a result, productivity may lower because of the required time for the switching processing of the print speed.

In this embodiment, if the optimization designation portion 708 is selected, the MFP 101 executes an operation to be described below. First, even if the page data that is the print target is stored in the HDD 209 of the MFP 101, print processing for the page data stored in the HDD 209 is temporarily interrupted until page data of a predetermined number of pages defined by a specific condition is accumulated, as shown in step S1212 to be described later. Then, the sheet information of sheets to be used at the time of printing is acquired in step S1211 to be described later. The determination processing of step S1211 is executed by the medium management program 406 based on the information of the medium database shown in FIG. 6A. At this time, the mixture state of the set contents in the print speed field 606 and the print speed field 607 in the sheet information of the sheets to be used to print the page data of the predetermined number of pages stored in the HDD 209 is determined. The determination processing is executed in step S1214 in accordance with the procedure shown in FIG. 13.

That is, in this embodiment, the values in the print speed field 606 and the print speed field 607 are determined in step S1305 to be described later for each sheet to be used to print the page data of the predetermined number of pages. As the result of determination, if the value in the print speed field 606 is "available" for all sheets of the mixed sheet types, this means that all sheet types used in print processing of the page data can be processed in the print speed mode of high speed. Hence, in this case, even if the mixture of sheet types occurs, switching processing of the print speed is unnecessary, and the sheets can be processed in the print speed mode of high speed that is a single speed.

If the value in the print speed field 606 is "not available" for any one of the mixed sheet types, this means that one of the sheet types used in print processing of the page data cannot be processed in the print speed mode of high speed. Hence, in this case, if the mixture of sheet types occurs, when printing a sheet that cannot be processed in the high-speed print mode, switching processing of the print speed occurs. In this embodiment, control is performed to select the print speed mode of low speed to make switching processing of the print speed unnecessary and execute print processing at a single print speed. This control is executed in steps S1309 and S1311 to be described later.

In this embodiment, if the optimization designation portion 708 is selected, pieces of sheet information to be used for the page data of the predetermined number of pages from the top of the print job are accumulated and analyzed before the start of print processing such that switching processing of the print speed does not occur. Then, a print speed that is as high as possible and does not cause switching of the print speed is decided based on the analyzed information. Execution of the print job is controlled by the decided print speed. Details of the operation of the PDF function program 405 when the optimization designation portion 708 is selected and details of the procedure will be described later.

An OK button 705 is used to accept an instruction for determining the settings made via the screens shown in FIGS. 7, 8, and 9 and storing the set contents in the HDD 209. On the other hand, a cancel button 704 is used to accept an instruction for ending the setting operation without determining the settings made via the screens shown in FIGS. 7, 8, and 9 and storing the set contents in the HDD 209.

An operation in a case where the quality designation portion 706, the productivity designation portion 707, and the optimization designation portion 708 are selected will be described below in detail. Hereinafter, assume a case where sheets processible at print speed 1 and sheets processible only at print speed 2 are mixed in pages included in a print job.

If the quality designation portion 706 is selected, even if a page processible at print speed 1 exists, print processing is performed for all sheets at print speed 2. In general, if a single sheet can be processed at a plurality of print speeds, executing print processing at a lower speed is advantageous in maintaining glossiness or evenness of images. In this case, even a sheet that can originally be processed at print speed 1 that is the high-speed print mode is processed at print speed 2 that is a low speed. Hence, priority is given to quality, and productivity is handled secondarily.

In a case where the productivity designation portion 707 is selected, if a sheet processible at print speed 1 exists, processing is performed at print speed 1 by print processing at the possible highest speed. However, if a sheet that can be processed only at print speed 2 is included in the job, as in the above-described example, the sheet cannot be printed at print speed 1 and is processed only at print speed 2. In this case, switching processing occurs between print speed 1 and print speed 2. However, if sheets processible at print speed 1 account for most of the sheets to be printed by the job, the advantage of high productivity in high-speed print mode 1 can be enjoyed.

In a case where the optimization designation portion 708 is selected, the operation is similar to that for the productivity designation portion 707 but is different in the following point. If the optimization designation portion 708 is selected, print processing of the print job is not immediately started, and for sheets for a predetermined number of pages from the top of the print job, the existence of a sheet processible at print speed 1 or a sheet processible only at print speed 2 or the mixture state of these sheets is determined. In a case where all the sheets for the predetermined number of pages can be processed at print speed 1, the possibility that sheets after the predetermined number of pages in the print job can be processed uniformly at print speed 1 is assumed to be high. Hence, in this case, print speed 1 is applied. Execution of the interrupted print processing is started at print speed 1.

On the other hand, in a case where all the sheets for the predetermined number of pages can be processed only at print speed 2, the possibility that sheets after the predetermined number of pages in the print job can be processed uniformly only at print speed 2 is assumed to be high. Hence, in this case, print speed 2 is applied. Execution of the interrupted print processing is started at print speed 2.

In a case where sheets processible at print speed 1 and sheets processible only at print speed 2 are mixed in the sheets for the predetermined number of pages, if print speed 1 or print speed 2 is applied to each sheet at the time of print processing, switching processing of the print speed occurs. In this case, the possibility that productivity lowers is high because of the occurrence of the switching time of the print speed. Hence, to suppress switching processing of the print speed, control is performed such that print processing of the sheets of the whole print job is performed by uniformly applying print speed 2 capable of processing both sheets. As described above, in this embodiment, sheet information is analyzed for the predetermined number of pages from the top of the print job, and the print speed is decided based on the analysis result, thereby suppressing the occurrence of switching of the print speed.

In this embodiment, the presence/absence of an occurrence of switching of the print speed is determined in the predetermined number of pages from the top of the print job, and an appropriate print speed is selected. However, the presence/absence of an occurrence of switching of the print speed may be determined using all sheets of the print job. Lowering of productivity can be prevented even if the determination is performed using the predetermined number of pages from the top of the print job. This is because the print job including a mixture of sheet types often designates different sheet types in pages near the top of the print job. For example, products in which thick coated paper is used for the covers, and plain paper is used for the text are generally widely produced. Since thick coated paper is coated paper with a large basis weight, image quality is maintained using the low-speed mode. That is, print speed 2 is an appropriate print speed, and print speed 1 that is a high speed can be applied to plain paper. In this case, the cover and the text exist in the top portion of the whole print job, and sheet types are mixed. That is, without analyzing all sheets of the print job, the form of a product can substantially be estimated by analyzing the predetermined number of pages from the top of the print job. As a result, it is possible to determine the presence/absence of an occurrence of switching of the print speed based on the predetermined number of pages from the top of the print job.

As another example, a case where a series of data formed by a plurality of records is executed as a single job, like variable printing, is assumed. More specifically, job data formed by connecting the pages of records made of a plurality of personal data is assumed. In a form in which, for example, preprinted paper is used for the top of a record, and plain paper is used for the main body of the record, a range corresponding to a predetermined number of pages in the top is assumed to include records of a plurality of sheet types. In this case as well, the presence/absence of an occurrence of switching of the print speed can be determined based on the analysis result of the predetermined number of pages from the top.

Figures 10A, 10B:
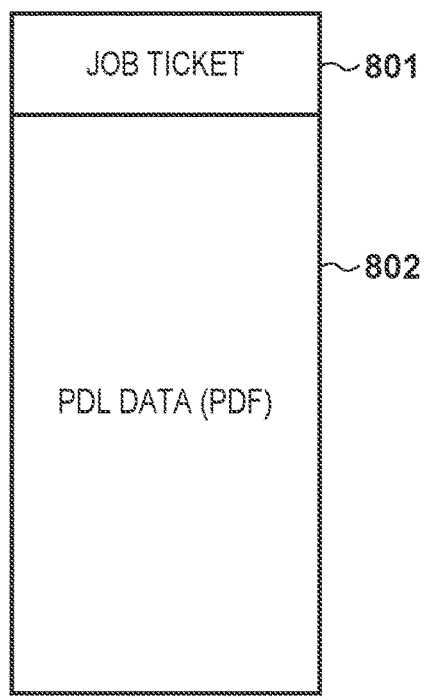
FIGS. 10A and 10B are views showing print job data.

FIGS. 10A and 10B are views showing an example of print job data. FIG. 10A is a view showing an example of the overall configuration of print job data. The print job data shown in FIG. 10A is created by various kinds of applications operating in the PC 102 or the like for the purpose of being processed by the PDF function program 405. As shown in FIG. 10A, the print job data is formed from a plurality of subdivided data, and these subdivided data are transmitted in a composed state from the PC 102 to the DFE 103 or the MFP 101.

A job ticket portion 801 is a data portion that stores print settings. In the example shown in FIG. 10A, the job ticket portion 801 includes setting information applied to the entire print job and the settings of various kinds of post-processing and image processing. In some cases, the job ticket portion 801 includes sheet setting information of each page.

A PDL data portion 802 is a data portion that stores image information forming each page and various kinds of print control commands. In the example shown in FIG. 10A, an example of a data portion formed by the PDF format is assumed. However, the data portion may be formed by a page description language of another type such as Postscript.

In this embodiment, the PDL data portion 802 is expanded, thereby acquiring medium information to be used for print processing of each page. In other words, medium information to be used for print processing of each page is stored in the PDL data portion 802, and these pieces of information are acquired by expanding the PDL data portion 802. However, the medium information may be designated in the job ticket portion 801.

FIG. 10B is a view showing an example of medium information for each page, which is acquired by expanding the PDL data portion 802 shown in FIG. 10A and used at the time of printing in the job. The information shown in FIG. 10B is extracted as the result of analyzing the PDL data portion 802 shown in FIG. 10A. The controller unit 205 of the MFP 101 controls, based on the information shown in FIG. 10B, to acquire sheet information used at the time of printing for each of the plurality of pages of the job and select and feed an appropriate sheet from one of the paper feeding units 225 shown in FIG. 1.

A page field 803 shows page numbers in the print job data shown in FIG. 10A. A sheet ID field 804 and a sheet type field 805 are fields that are set for the purpose of being used when printing page data shown in the page field 803 and store the sheet information after the expansion of the PDL data portion 802.

FIG. 10B shows an example of print job data in which a mixture of sheet types is set. That is, a medium 806 for which the sheet ID is "011", and the sheet type is "coated paper B" is set for pages 1 to 46. Similarly, a medium 807 for which the sheet ID is "012", and the sheet type is "coated paper C" is set for pages 47 and 48. A medium 808 for which the sheet ID is "020", and the sheet type is "coated paper X" is set for page 49. The medium 806 for which the sheet ID is "011", and the sheet type is "coated paper B" is set for pages 50 to 100.

Figures 11, 12:
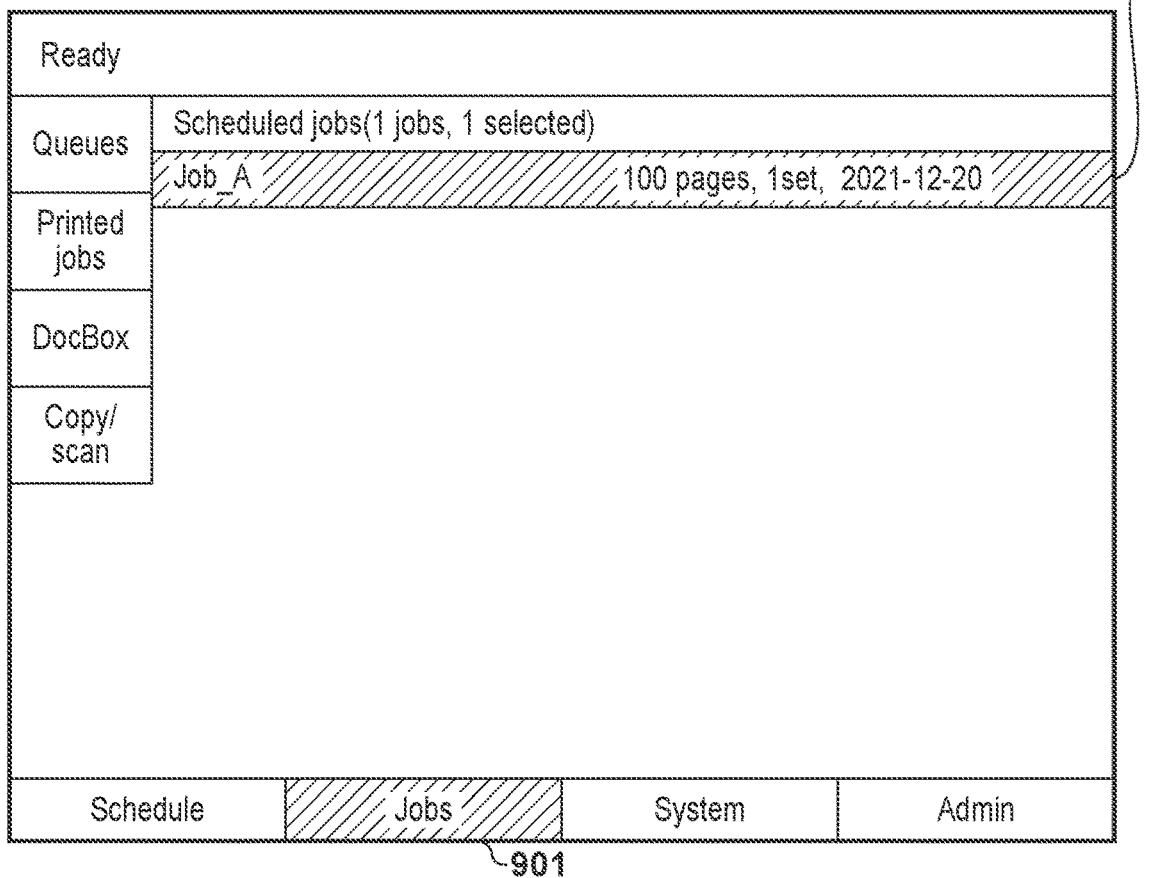
FIG. 11 is a view showing a job management screen.
FIG. 12 is a view showing job page data.

FIG. 11 is a view showing an example of a job management screen displayed on the monitor 105 (or the display unit 310) provided in the DFE 103. FIG. 11 shows a state in which Job_A 902 is registered in the DFE 103 in a state in which as job management screen selection portion 901 is selected. The Job_A 902 is transmitted from, for example, the PC 102 to the DFE 103. When the DFE 103 receives the job data, the job data is immediately executed for the connected MFP 101. In other words, the job data received by the DFE 103 is immediately processed when it is transmitted to the MFP 101, thereby instructing execution of the print job.

FIG. 12 is a view showing an example of job page data generated and managed in the MFP 101 when the MFP 101 receives the Job_A 902 shown in FIG. 11 and determines the print speed to be applied at the time of printing. The job page data is formed by a plurality of fields to be described below. The information shown in FIG. 12 is obtained from the result of the PDF function program 405 receiving and analyzing the print job data shown in FIGS. 10A and 10B. However, as shown in FIG. 12, the job page data does not include the information of all pages of the received print job data, and holds only the information of a predetermined number of pages determined in advance by the system of the MFP 101, for example, 50 pages from the top.

The predetermined number of pages shown in FIG. 12 is merely an example, and the present invention is not limited to this. For example, information of the number of pages according to the resource may be held. In addition, the number of pages is preferably set such that a time required for accumulation of job page data of the predetermined number of pages becomes shorter than a time required for switching processing of the print speed. Hence, an arbitrary method can be applied as the method of deciding or selecting the predetermined number of pages for satisfying the condition. The time required for accumulation of job page data of the predetermined number of pages is, for example, the time required for the expansion processing of the predetermined number of pages of the PDL data portion 802 shown in FIG. 10A. In this embodiment, the time required for the expansion processing of the predetermined number of pages is assumed to be much shorter than the time required for print processing of the corresponding predetermined number of pages.

For each of the pages of job data shown by a page field 1001, the sheet information of a sheet used in printing is shown by a sheet ID field 1002 and a sheet type field. In addition, concerning the sheet used in printing of each page, applicability of print speed 1 that is a high-speed print mode and that of print speed 2 that is a low-speed print mode are shown by a print speed field 1003 and a print speed field 1004.

In this embodiment, pieces of sheet information concerning the predetermined number of pages (for example, 50 pages) from the top in all pages forming the print job data are accumulated and analyzed before the start of print processing. The print speed is decided based on the analysis result, and print processing is started at the decided print speed. Hence, for example, even if the Job_A 902 that is job data is formed by 100 pages, 50 pages from the top are accumulated as the predetermined number of pages, and the optimum print speed is determined based on the sheet information of sheets used in these pages at the time of printing.

As shown in FIG. 12, in the 50 pages that are the predetermined number of pages from the top of the job, only for the sheet of a row 1005 of the 49th page, the value in the print speed field 1003 is "not available", and the value in the print speed field 1004 is "available". For the sheets of the pages other than the row 1005 of the 49th page, both the value in the print speed field 1003 and the value in the print speed field 1004 are "available".

That is, if the MFP 101 receives the print job data shown in FIG. 10B, it is determined that, of the sheets selected at the time of printing of the print job data, a sheet printable only at print speed 2 is included in the 49th page of the 50 pages from the top. In other words, for the pages other than the 49th page, it is determined that print processing at print speed 1 is possible. However, when printing the sheet of the 49th page, printing needs to be performed only at print speed 2 that is the low-speed mode, and when switching the print speed mode, the switching time is added to the processing time. Similarly, when print processing of the 49th page is ended, and print processing for the 50th and subsequent pages is executed, processing at print speed 1 can be performed again. Hence, switching of the print speed from print speed 2 to print speed 1 occurs, and the switching time is added to the processing time.

In this embodiment, generation of the switching time can be suppressed by performing the following processing. That is, like page 49 shown in the row 1005, if it is determined that a sheet to which print speed 1 of the high-speed print mode cannot be applied exists, it is determined, before the start of print processing, to apply print speed 2 such that switching processing is not required, and control is performed to execute the print job at print speed 2. Since this makes the time required for switching processing unnecessary and eliminates the factor to lower the productivity, high productivity can be maintained.

FIGS. 13A, 13B, and 13C are views for explaining effects in the operation according to this embodiment. Hereinafter, as an example, FIGS. 13B and 13C will be described below concerning a case where conditions shown in FIG. 13A are used.

As shown in FIG. 13A, of the print speed modes of the MFP 101, print speed 1 that is the high-speed print mode is 100 PPM. Print speed 2 that is the low-speed print mode is 75 PPM. Switching between print speed 1 and the print speed 2 requires 30 sec. Also, the predetermined number of pages of job page data is 50 pages, as shown in FIG. 12, and the total number of pages of print job data is 100 pages, as shown in FIG. 10B.

FIG. 13B shows required times at print speeds applied to pages at the time of printing and a switching required time in a case where switching of the print speed occurs when conventional print processing is executed using the conditions shown in FIG. 13A. The ordinate represents the required time at a print speed 1101 (print speed 1), the required time at a print speed 1102 (print speed 2), and the required time of a switching time 1103. The abscissa represents accumulation of required times from the start of processing.

As shown in FIG. 10B, media for which print processing at print speed 1 can be performed are used in pages 1 to 48 of the job data. Processing is performed in the high-speed print mode at 100 PPM, and a required time 1105 is 28.8 sec. On the other hand, for the medium of the 49th page, processing at print speed 1 cannot be performed, and only print speed 2 is possible. For this reason, switching processing of the print speed occurs, and a switching time 1106 is required. After the switching processing is ended, print processing of the 49th page is executed, and a required time 1107 is 0.8 sec. For the medium of pages 50 to 100, processing at print speed 1 can be performed. Hence, the MFP 101 switches the print speed from print speed 2 to print speed 1 again. At this time, a switching time 1108 is required again. A required time 1109 for printing of pages 50 to 100 is 30.6 sec. Thus, a cumulative time 1110 is 120.2 sec.

FIG. 13C shows required times at print speeds applied to pages at the time of printing and a switching required time in a case where switching of the print speed occurs when print processing according to this embodiment is executed using the conditions shown in FIG. 13A.

As shown by the job page data in FIG. 12, the 50 pages, that is, the predetermined number of pages include the 49th page (row 1005) that is a sheet to which print speed 1 cannot be applied. Hence, in this embodiment, before the start of print processing, the MFP 101 decides, based on the sheet information of the job page data shown in FIG. 12, print speed 2 as the print speed to be applied at the time of printing of the job, and executes print processing using the decided print speed. As a result, all pages are printed at print speed 2, and a required time 1111 is 80 sec, as shown in FIG. 13C. As a result, a cumulative time 1112 is 80.0 sec.

As described above, the MFP 101 according to this embodiment determines the sheet information of the predetermined number of pages from the top of print job data before the start of print processing, and decides, based on the determined information, a print speed that does not cause switching processing of the print speed. Then, control is performed to start print processing based on the decided print speed. It is therefore possible to effectively eliminate the factor that is derived from switching processing and lowers the productivity, and perform control to maintain high productivity.

Figure 14:
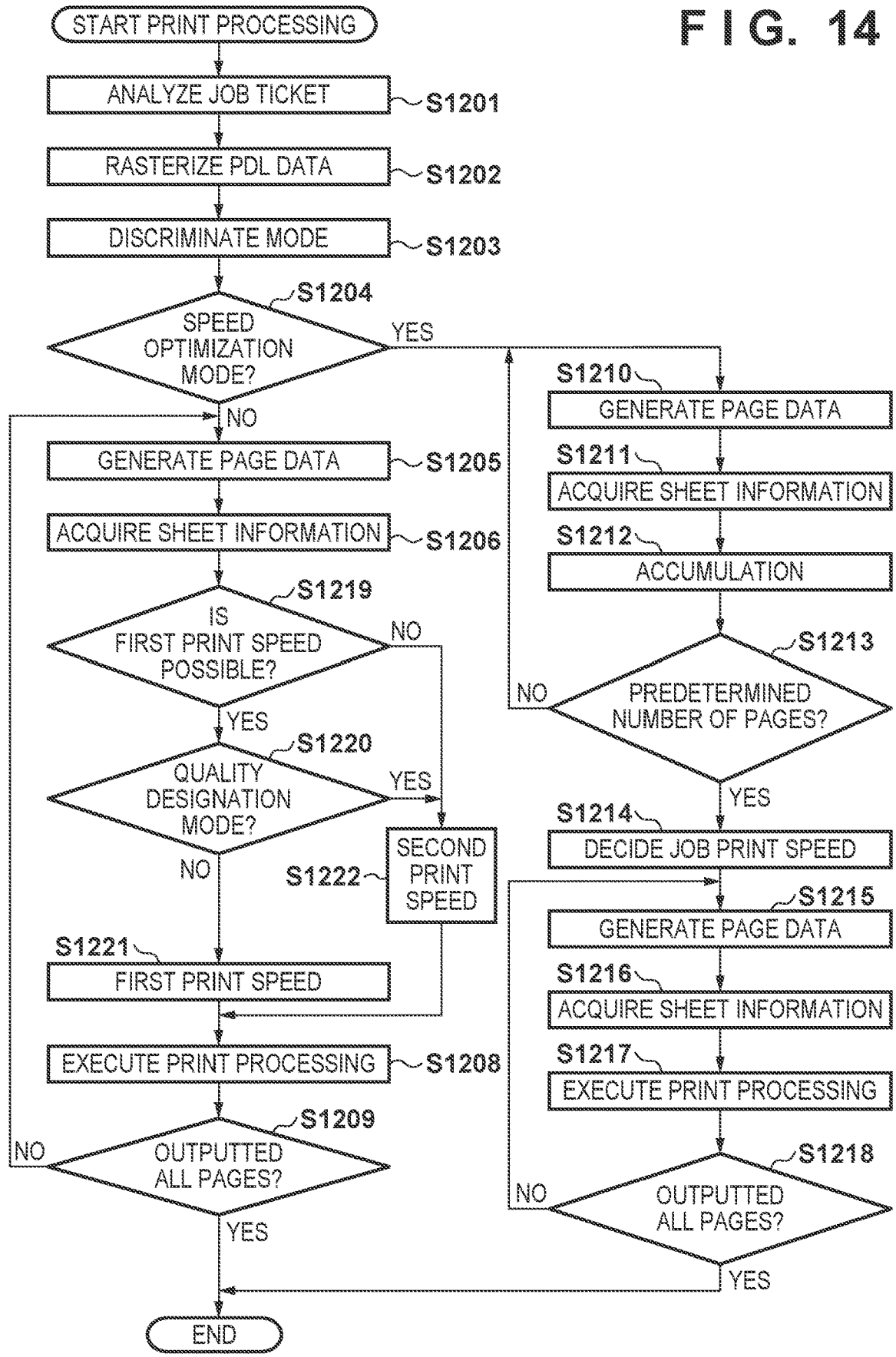
FIG. 14 is a flowchart showing print control processing.

FIG. 14 is a flowchart showing print control processing according to this embodiment. The processing shown in FIG. 14 is implemented by, for example, the controller unit 205 executing the PDF function program 405 of the MFP 101.

In step S1201, the controller unit 205 analyzes the contents of the job ticket portion 801 of print job data. Information included in the job ticket portion 801 has been described above with reference to FIG. 10A.

In step S1202, the controller unit 205 starts expansion processing of the PDL data portion 802. The expansion processing in step S1202 includes conversion and generation processing of the page data of the print target. These processes can be executed concurrently with page data generation processing (step S1205 or S1210) that is a part of print processing.

In step S1203, the controller unit 205 acquires the set contents of print speed modes accepted via the screens shown in FIGS. 7 to 9. More specifically, the controller unit 205 acquires the set contents of the optimization designation portion 708 shown in FIG. 9.

In step S1204, the controller unit 205 determines whether the optimization designation portion 708 is designated. If it is determined that the optimization designation portion 708 is designated, processing of suppressing the occurrence of switching of the print speed described with reference to FIG. 13C is executed from step S1210. On the other hand, if it is determined in step S1204 that the optimization designation portion 708 is not designated, print processing described with reference to FIG. 13B is executed from step S1205.

Print processing from step S1205 will be described first. Print processing from step S1205 is executed in a case where one of the quality designation portion 706 and the productivity designation portion 707 shown in FIG. 9 is selected, and the optimization designation portion 708 is not selected.

In step S1205, the controller unit 205 generates page data to be used in printing from the data expanded in step S1202. More specifically, the PDF function program 405 performs conversion processing from the data of the PDL data portion 802 to data in the bitmap format that is the format used when the printer unit 203 forms an image on a sheet, thereby generating page data. The conversion processing is executed by the compression/decompression unit 206.

In step S1206, the controller unit 205 acquires the sheet information of sheets to be used when printing the page data generated in step S1205. Here, the sheet information includes the information of sheet types. The processing of step S1206 is performed by specifying a corresponding sheet from the information stored in the medium database shown in FIG. 6A and acquiring a necessary parameter set.

In the print processing executed from step S1205, the print processing progresses by sequential processing for immediately printing the page data generated in step S1205. Hence, when the sheet information is acquired in step S1206, the process advances to step S1219.

In step S1219, the controller unit 205 determines whether the sheet type acquired in step S1206 is a medium to which print speed 1 that is the high-speed print mode can be applied. If it is determined in step S1219 that the sheet type is not a medium to which print speed 1 can be applied, this means that the sheet type acquired in step S1206 is a sheet type to which only print speed 2 that is the low-speed print mode can be applied. In this case, the process advances to step S1222, and the controller unit 205 selects print speed 2 as the print speed to be applied in printing of the sheet.

If it is determined in step S1219 that the sheet type is a medium to which print speed 1 can be applied, the process advances to step S1220, and the controller unit 205 determines whether the quality designation portion 706 is selected. Which one of the quality designation portion 706 and the productivity designation portion 707 shown in FIG. 9 is selected may be determined. If it is determined that the quality designation portion 706 is selected, applying not print speed 1 but print speed 2 is preferable, as described above with reference to FIG. 9. Hence, the process advances to step S1222, and the controller unit 205 selects print speed 2 as the print speed to be applied in printing of the sheet.

On the other hand, if it is determined in step S1220 that the quality designation portion 706 is not selected, this means that, for example, the productivity designation portion 707 is selected. That is, print speed 1 can be applied. Hence, the process advances to step S1221, and the controller unit 205 selects print speed 1 as the print speed to be applied in printing of the sheet.

In step S1208, the controller unit 205 applies the print speed selected in step S1221 or S1222 and executes print processing by the printer unit 203.

If the PDL data portion 802 is data formed by a plurality of pages, the above-described processes of steps S1205, S1206, S1219 to S1222, S1208, and S1209 are repeated for each page (loop processing). In step S1209, the controller unit 205 determines whether the print processing is executed for all pages. If it is determined that the print processing is not executed for all pages, the processing from step S1205 is repeated. That is, the processing is repeated for the plurality of pages included in the print job data. On the other hand, if it is determined in step S1209 that the print processing is executed for all pages, the processing shown in FIG. 14 is ended.

Print processing from step S1210 will be described next.

In steps S1210 and S1211, the same processes as in steps S1205 and S1206 are performed, and a description thereof will be omitted.

In step S1212, the controller unit 205 accumulates, in the HDD 209, the page data generated in step S1210 and the sheet information acquired in step S1211. In step S1212, the controller unit 205 generates job page data from the sheet information acquired in step S1211 and stores it in the HDD 209.

During the execution of the accumulation processing in steps S1210 to S1212 described above, unlike the print processing from step S1205, print processing of the page data generated in step S1210 is not sequentially performed. In the print processing from step S1210, execution of print processing is suppressed (stopped) until accumulation of page data and job page data of the predetermined number of pages is completed. The purpose is to decide the print speed to be applied based on the information of the print speed field 1003 and the print speed field 1004 included in the job page data accumulated in the HDD 209.

In step S1213, the controller unit 205 determines whether page data and job page data of the predetermined number of pages are accumulated in the HDD 209. If it is determined that page data and job page data of the predetermined number of pages are accumulated, the process advances to step S1214. On the other hand, if it is determined that page data and job page data of the predetermined number of pages are not accumulated, the processing from step S1210 is repeated. As a result, the job page data shown in FIG. 12 is stored in the HDD 209. As described above, in this embodiment, the print speed to be applied is not decided until the accumulation processing is completed, and control is performed not to start print processing during the accumulation processing.

In step S1214, the controller unit 205 decides the print speed to be applied in printing based on the result of the processes in steps S1210 to S1213 and the job page data accumulated in the HDD 209. That is, the sheet information of the predetermined number of pages from the top of the job is analyzed, and an appropriate print speed is decided based on the analysis result. In this embodiment, for example, "50 pages" of the job page data shown in FIG. 12 has been described as the predetermined number of pages. However, the number of pages is not limited to this. Details of the processing of step S1214 will be described later.

Print processing is started from step S1215. In step S1215, the controller unit 205 generates page data to be used in printing from the data expanded in step S1202. Note that the processing of step S1215 is executed not for pages whose page data have already been generated in step S1210 but for pages whose page data are not generated yet in step S1210. For example, since page data of the 51st page is not generated yet in step S1210, the page data is generated in step S1215.

In step S1216, the controller unit 205 acquires the sheet information of sheets to be used when printing the page data generated in step S1210 or S1215. Here, the sheet information includes the information of sheet types. In step S1217, the controller unit 205 executes print processing by the printer unit 203 using the print speed decided in step S1214.

If the PDL data portion 802 is data formed by a plurality of pages, the above-described processes of steps S1215 to S1218 are repeated for each page (loop processing). In step S1218, the controller unit 205 determines whether the print processing is executed for all pages. If it is determined that the print processing is not executed for all pages, the processing from step S1215 is repeated. If it is determined in step S1209 that the print processing is executed for all pages, the processing shown in FIG. 14 is ended.

Figure 15:
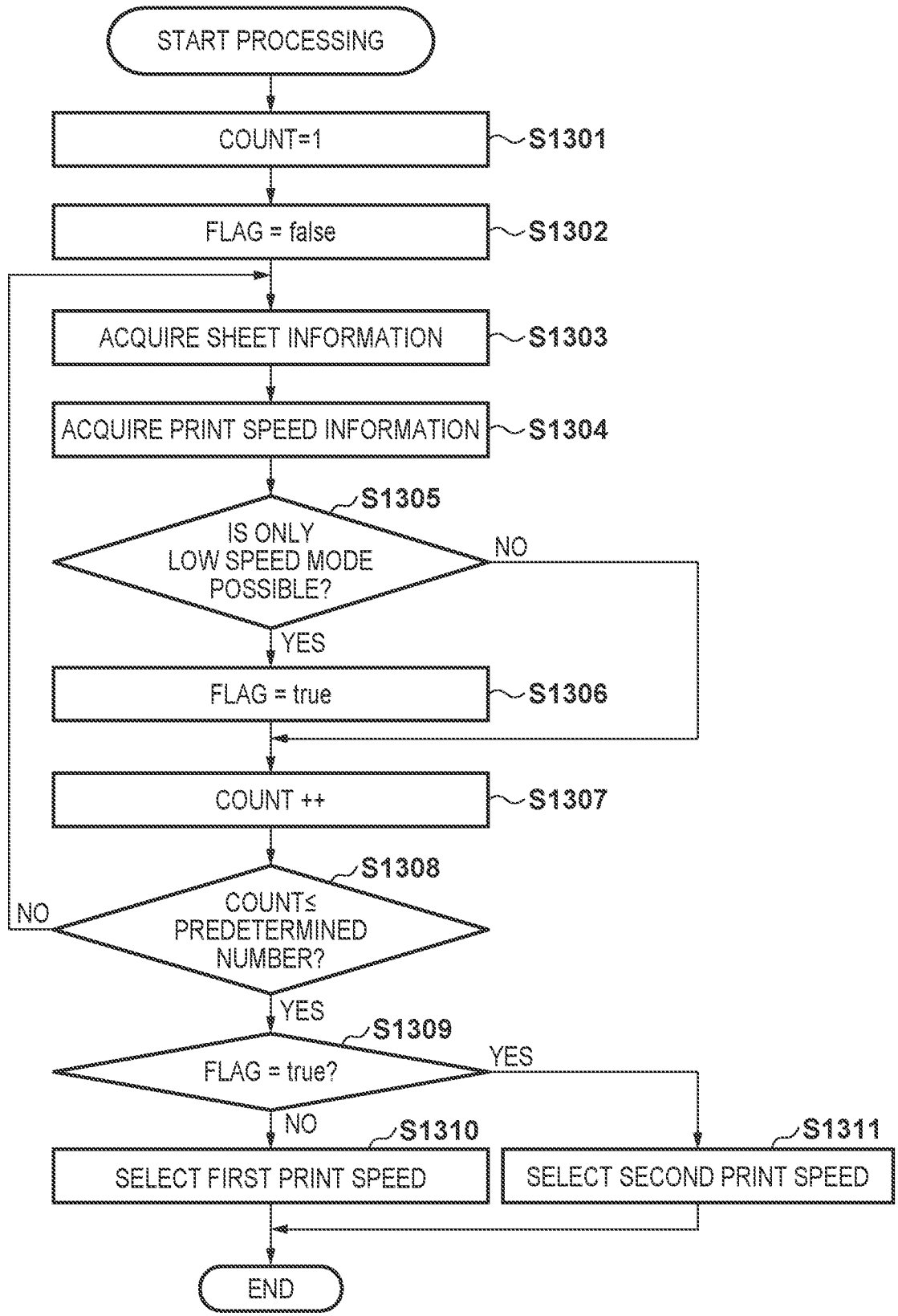
FIG. 15 is a flowchart showing print control processing.

FIG. 15 is a flowchart showing processing of step S1214 in FIG. 14, that is, processing of deciding the print speed to be applied at the time of printing based on the job page data generated and stored as the result of processing in steps S1210 to S1213.

In step S1301, the controller unit 205 initializes a counter used to determine the sheet information of the predetermined number of pages from the top in all pages of the print job to "1". Here, the sheet information of the predetermined number of pages is, for example, the sheet information of 50 pages included in the job page data shown in FIG. 12.

In step S1302, the controller unit 205 sets the initial value of a print speed selection flag to "false". The print speed selection flag is used in the following determination. If a given sheet can be printed both at print speed 1 that is the high-speed print mode and at print speed 2 that is the low-speed print mode, the value of the print speed selection flag is set to "false". On the other hand, if a given sheet can be printed not at print speed 1 that is the high-speed print mode but only at print speed 2 that is the low-speed print mode, the value of the print speed selection flag is set to "true".

In step S1303, the controller unit 205 acquires the sheet information of the page at the top of the job page data. In step S1304, the controller unit 205 acquires print speed information. More specifically, print speed 1 in the print speed field 606 in the print speed table shown in FIG. 6B and print speed 2 in the print speed field 607 are acquired.

In step S1305, the controller unit 205 determines whether print speed 1 that is the high-speed print mode can be applied to the sheet used for the page of interest (here, the first page) indicated by the counter. If it is determined that print speed 1 cannot be applied, the sheet used for the target page can be printed only at print speed 2 that is the low-speed print mode. Hence, the process advances to step S1306, and the controller unit 205 sets the value of the print speed selection flag to "true".

If it is determined in step S1305 that print speed 1 can be applied, the sheet used for the target page can be printed both at print speed 1 and at print speed 2. In this case, the value of the print speed selection flag remains "false". When the processes of steps S1305 and S1306 are ended, the process advances to step S1307, and the controller unit 205 increments the value of the counter.

In step S1308, the controller unit 205 determines whether the value of the counter is equal to or smaller than a predetermined number. The predetermined number is the value of the predetermined number of pages of job data. If it is determined in step S1308 that the value of the counter is equal to or smaller than the predetermined number, the processing from step S1303 is repeated. On the other hand, if it is determined in step S1308 that the value of the counter exceeds the predetermined number, the process advances to step S1309. Note that the processing of step S1304 may be skipped in the second and subsequent cycles.

In step S1309, the controller unit 205 determines the value of the print speed selection flag. If it is determined in step S1309 that the value of the print speed selection flag is "false", both print speed 1 and print speed 2 can be applied to a sheet used for any page included in the job page data. Hence, in this case, the process advances to step S1310, and the controller unit 205 selects print speed 1 as the print speed to be applied in printing. As a result, a product can efficiently be generated in the high-speed print mode. More specifically, print processing is executed in step S1217 at print speed 1 in the field 606 shown in FIG. 6B.

On the other hand, if it is determined in step S1309 that the value of the print speed selection flag is "true", for a sheet used in a page included in the job page data, print speed 1 cannot be applied, and print processing can be performed only at print speed 2. In this case, the print speed of the high-speed print mode cannot be applied in printing. Hence, in this embodiment, a product is generated in the low-speed print mode, thereby suppressing the occurrence of switching processing of the print speed. Hence, the process advances to step S1311, and the controller unit 205 selects print speed 2 as the print speed to be applied in printing. As a result, even if sheets of media for which the applicable print speeds are different exist in mixture, the processing can be performed as efficiently as possible. More specifically, print processing is executed in step S1217 at print speed 2 in the print speed field 607 shown in FIG. 6B.

Second Embodiment

The second embodiment will be described below concerning points different from the first embodiment. In the first embodiment, the MFP 101 has a high-speed print mode and a low-speed print mode. The sheet information of a predetermined number of pages from the top of job page data that forms a print job is analyzed before the start of print processing, and an applicable print speed is determined. In this embodiment, an MFP 101 has not only print speed 1 in the high-speed print mode and print speed 2 in the low-speed print mode but also a mode in which printing is performed using at least one third print speed (to be referred to as print speed 3).

FIG. 16 is a view showing an example of information stored in a print speed table according to this embodiment. Unlike FIG. 6B, print speed 3 is stored as a print speed field 1401 in the print speed table.

Figure 17A:
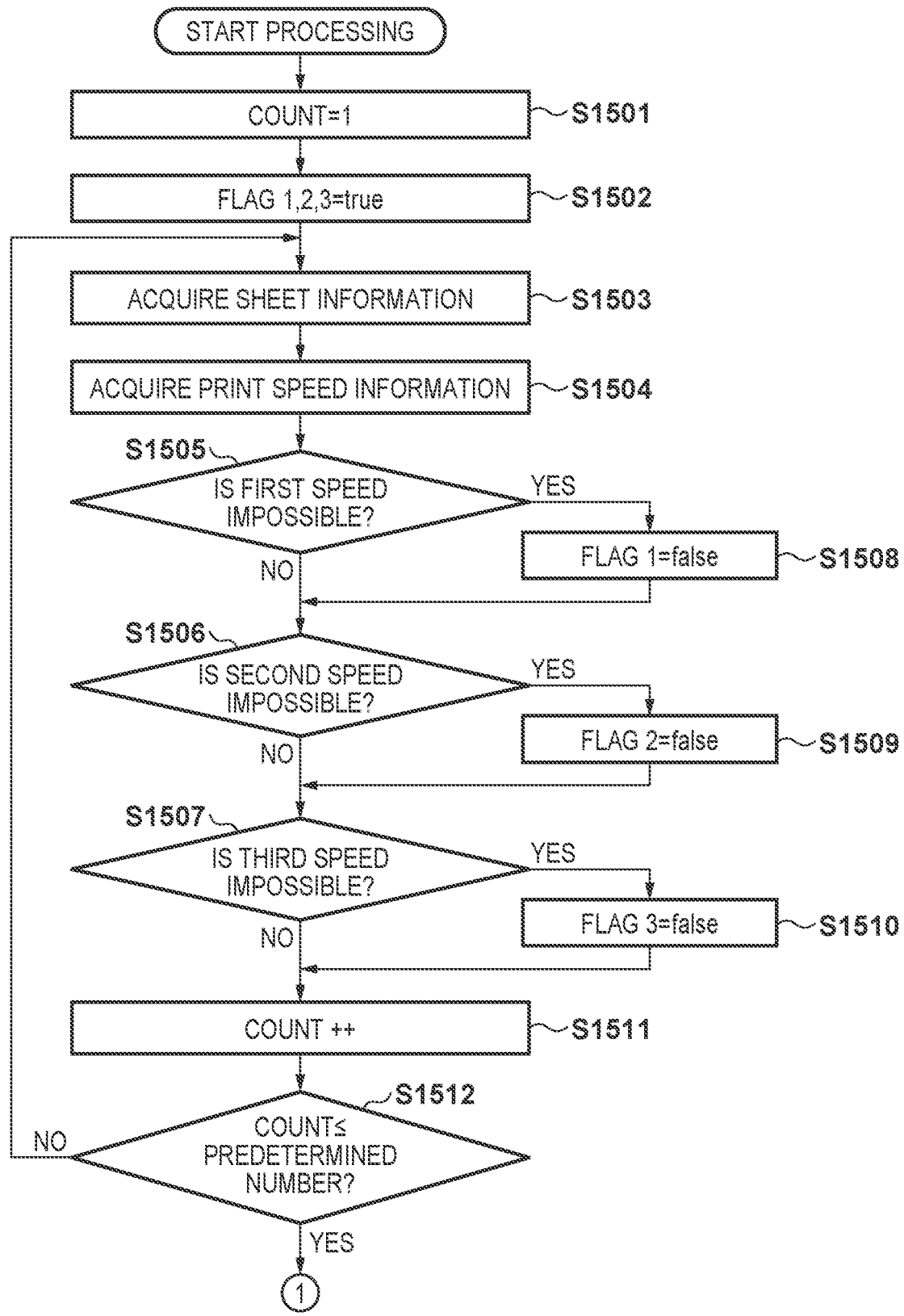
FIGS. 17A and 17B are flowcharts showing print control processing.
Figure 17B:
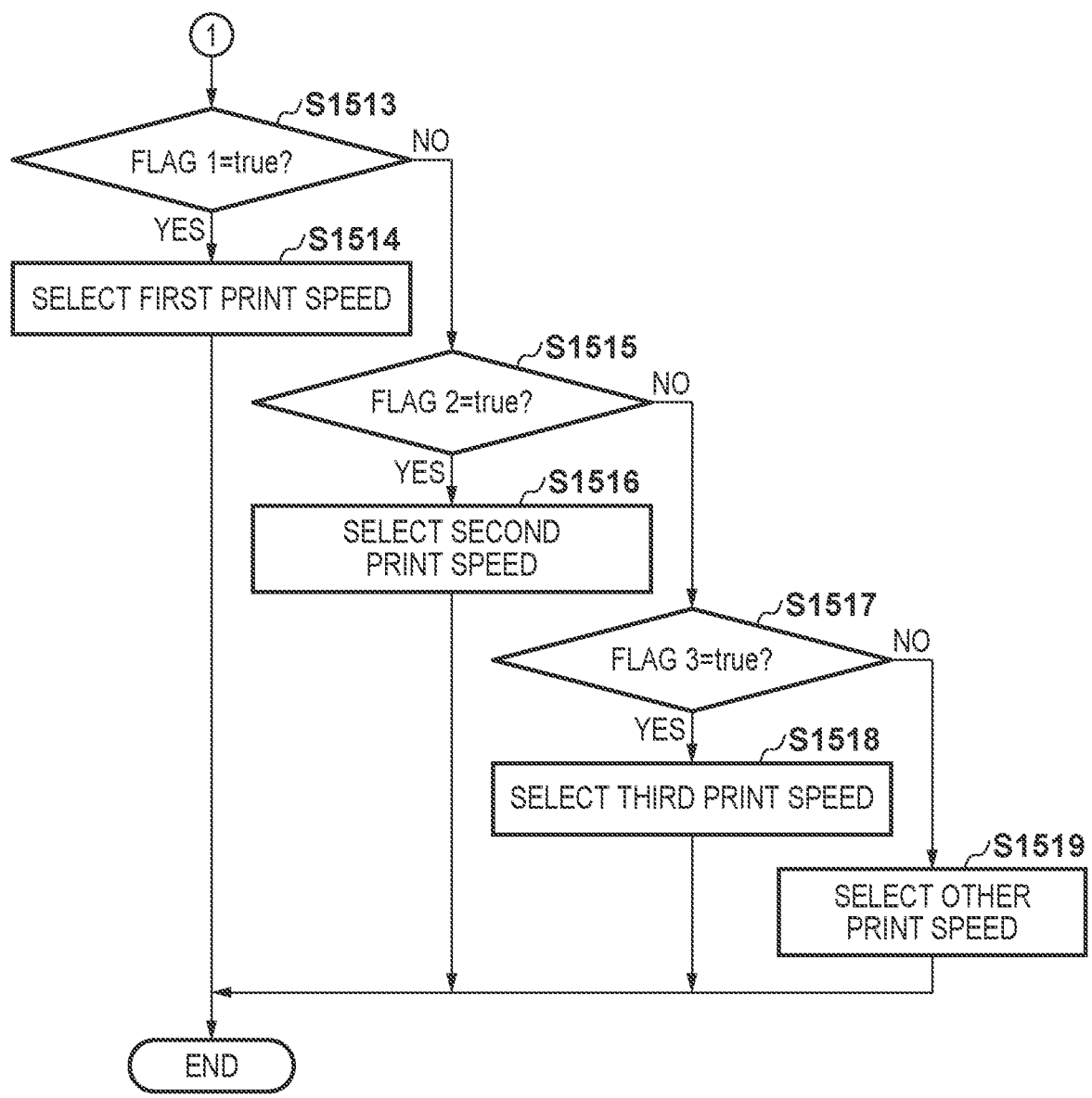

FIGS. 17A and 17B are flowcharts showing processing of deciding the print speed in this embodiment. The processing shown in FIGS. 17A and 17B is implemented by, for example, a controller unit 205 reading out a PDF function program 405 from a ROM 207 and executing it.

Step S1501 is the same as described concerning step S1301 in FIG. 15, and a description thereof will be omitted.

In step S1502, the controller unit 205 initializes all of flag 1, flag 2, and flag 3 for print speed selection by a value of "true". Here, flag 1 is a flag used to determine whether print speed 1 is applicable. Flag 2 is a flag used to determine whether print speed 2 is applicable. Flag 3 is a flag used to determine whether print speed 3 is applicable. In this embodiment, to determine the presence/absence of switching of three or more different print speeds, a flag used to determine the applicability is set for each print speed.

Steps S1503 and S1504 are the same as described concerning steps S1303 and S1304 in FIG. 15, and a description thereof will be omitted.

In step S1505, the controller unit 205 determines the print speed information acquired in step S1504 concerning a sheet used for the page of interest (here, the first page) indicated by the counter. That is, it is determined whether print speed 1 can be applied. If it is determined that print speed 1 cannot be applied, the process advances to step S1508, and the controller unit 205 sets flag 1 to "false". On the other hand, if it is determined that print speed 1 can be applied, the process advances to step S1506.

In step S1506, the controller unit 205 further determines the print speed information acquired in step S1504. That is, it is determined whether print speed 2 can be applied. If it is determined that print speed 2 cannot be applied, the process advances to step S1509, and the controller unit 205 sets flag 2 to "false". On the other hand, if it is determined that print speed 2 can be applied, the process advances to step S1507.

In step S1507, the controller unit 205 further determines the print speed information acquired in step S1504. That is, it is determined whether print speed 3 in the speed field 1401 can be applied. If it is determined that print speed 3 cannot be applied, the process advances to step S1510, and the controller unit 205 sets flag 3 to "false". On the other hand, if it is determined that print speed 3 can be applied, the process advances to step S1511.

By the processing up to step S1510, it is possible to determine which speed should be used to perform print processing at a uniform speed. In other words, it is possible to execute print processing in a single print speed mode without causing switching of the print speed. As a result, lowering of productivity caused by print speed switching can be suppressed.

Steps S1511 and S1512 are the same as described concerning steps S1307 and S1308 in FIG. 15, and a description thereof will be omitted.

From step S1513, the single print speed mode is decided. In step S1513, the controller unit 205 determines the value of flag 1. Here, if it is determined that the value of flag 1 is "true", this means that a sheet to which print speed 1 cannot be applied does not exist in any page of the job page data. In other words, in this case, print processing can be executed using print speed 1. Hence, in step S1514, the controller unit 205 selects print speed 1 as the print speed to be applied in printing.

If it is determined in step S1513 that the value of flag 1 is "false", the process advances to step S1515. In step S1515, the controller unit 205 determines the value of flag 2. Here, if it is determined that the value of flag 2 is "true", this means that print speed 1 cannot be applied, but a sheet to which print speed 2 cannot be applied does not exist in any page of the job page data. In other words, in this case, print processing can be executed using print speed 2. Hence, in step S1516, the controller unit 205 selects print speed 2 as the print speed to be applied in printing.

If it is determined in step S1515 that the value of flag 2 is "false", the process advances to step S1517. In step S1517, the controller unit 205 determines the value of flag 3. Here, if it is determined that the value of flag 3 is "true", this means that print speed 1 and print speed 2 cannot be applied, but a sheet to which print speed 3 cannot be applied does not exist in any page of the job page data. In other words, in this case, print processing can be executed using print speed 3. Hence, in step S1518, the controller unit 205 selects print speed 3 as the print speed to be applied in printing.

If it is determined in step S1517 that the value of flag 3 is "false", the process advances to step S1519. In step S1519, the controller unit 205 selects another print speed as the print speed to be applied in printing.

As described above, even if there are provided three or more print speed modes, it is possible to determine, for each print speed, whether a print speed applicable to the sheet of each page included in the analysis result stored in the job page data can be applied. At this time, the determination is performed preferentially from the highest print speed. Hence, even if there exist three or more print speed modes, the highest print speed capable of suppressing the occurrence of switching processing of the print speed can be decided.

Third Embodiment

The third embodiment will be described below concerning points different from the first and second embodiments. In the first and second embodiments, control is performed not to start print processing until the processing shown in FIGS. 15 and 17, that is, decision of a print speed to be applied in printing based on job page data of a predetermined number of pages shown in FIG. 12. In this embodiment, a case where print processing is started before the print speed to be applied in printing is decided will be described.

In this embodiment, accumulation processing of job page data in steps S1210 to S1213 is executed, as in the first and second embodiments. In the first and second embodiments, the processing of step S1211 for deciding the print speed to be applied in printing is executed after steps S1210 to S1213, and after that, the processes of steps S1215 to S1217 are executed. On the other hand, in this embodiment, even before accumulation processing of job page data in steps S1210 to S1213, for example, accumulation processing of job page data of 50 pages is completed, when, for example, the job page data of the second page from the top is generated in step S1210, the sheet information of job page data for the page is acquired, and print processing is executed. Then, the sheet information of job page data for each page after the second page is acquired, and print processing is executed.

The above operation will be described with reference to FIGS. 18A and 18B. FIG. 18A shows the operation according to the first and second embodiments. That is, in a period 1801, job page data of, for example, 50 pages are accumulated. After that, in a period 1802, a print speed is decided based on the accumulated job page data of 50 pages, and execution of print processing is started.

FIG. 18B shows the operation according to this embodiment. That is, the operation in the periods 1801 and 1802 is performed in the same way as in FIG. 18A. Concurrently with the period 1801, in a period 1803, print processing is sequentially executed for the job page data of each page from, for example, the second page. In the period 1803, for example, the processing of step S1303 or S1503 and the processing of steps S1215 to S1217 are performed. However, in the period 1803, processing of accumulating job page data and deciding the print speed is not performed. Hence, in the period 1803, switching of the print speed may occur. When the period 1803 is ended, the print speed is decided based on the job page data accumulated in the period 1801, and print processing is executed. The processing in the periods 1801 and 1802 shown in FIG. 18B is similar to the operation in the first and second embodiments.

The effect of this embodiment will be described. In the period 1803, there can be a case where switching of the print speed does not occur. For example, if print speed 1 can be applied to sheets used for all the 50 pages, switching of the print speed does not occur. Also, print speed 1 is decided as the print speed based on the accumulation in the period 1801. That is, consequently, the result of deciding the print speed equals the result of actually executing print processing concurrently, and the start timing of print processing can be made earlier as compared to FIG. 18A.

On the other hand, in the period 1803, there can be a case where switching of the print speed occurs. For example, if sheets to which print speed 1 can be applied and sheets to which print speed 2 can be applied are mixed in the 50 pages, switching of the print speed occurs in the period 1803. On the other hand, print speed 2 is decided as the print speed based on the accumulation in the period 1801, and print processing is executed at print speed 2 from the 51st page. In this case, although switching of the print speed occurs, the start timing of print processing is made earlier as compared to FIG. 18A. Hence, even if the time required for switching of the print speed exists, there is a possibility that the productivity can be improved as in the first and second embodiments because the start timing of print processing is made earlier.

As described above, in this embodiment, the start timing of print processing is made earlier. In addition, the processes shown in FIGS. 18A and 18B may be switched. For example, the processes shown in FIGS. 18A and 18B may be switched based on the analysis result of a job ticket portion 801 in step S1201. For example, if the analysis result of the job ticket portion 801 includes information representing the output mode of a bookbinding product (for example, "plain paper is used for the text"), the processes shown in FIGS. 18A and 18B may be switched for each print job data based on the information.

Fourth Embodiment

The fourth embodiment will be described below concerning points different from the first to third embodiments. In the first to third embodiments, the print speed of an entire job is decided before the start of print processing based on the sheet information of a predetermined number of pages at the top of the job. This embodiment assumes, for example, a case where it is discriminated that a predetermined number of pages at the top of a job can be processed at a first print speed, but all pages after the predetermined number of pages can be processed only at a second print speed. In this embodiment, in a case as described above, the print speed is decided based on the predetermined number of pages at the top before the start of printing, and after that, print processing is executed while more optimally deciding the print speed at the time of execution of the print processing based on succeeding unprinted page information.

FIG. 19A is a view for explaining the effect of this embodiment, and shows an example of information of job page data that forms a job. Print speed decision according to this embodiment will be described using the example shown in FIG. 19A. As shown in FIG. 19A, this job is formed by a predetermined number of pages at the top, here, 50 pages using sheets for which high-speed printing at print speed 1 can be performed and pages from the 51st page using sheets processible only at print speed 2. The print speed of the job is decided by the processing described in the first embodiment based on the analysis result of the sheet information of the predetermined number of pages, and is decided as print speed 1 in the example shown in FIG. 19A.

After print processing is started, and print processing of the first page (1901) is executed at print speed 1, the print speed is obtained again by the processing according to the first embodiment concerning the range of a new predetermined number of pages, which is obtained by excluding the printed page (first page) from the predetermined number of pages and adding page information next to the predetermined number of pages. In other words, in the example shown in FIG. 19A, the pieces of sheet information of the second page (1902) to the 51st page (1904) are set to the range of the predetermined number of pages, and the print speed information is discriminated. As shown in FIG. 19A, the range from the second page (1902) to the 51st page (1904) includes sheets processible only at print speed 2. In other words, when the sheets of the second page (1902) to the 51st page (1904) are printed, switching processing of the print speed occurs.

There can be considered a method of changing the print speed from currently set print speed 1 to print speed 2 immediately at the stage of the discrimination processing and performing print processing of the second page (1902). However, it is more advantageous in terms of processing speed when the print processing is executed as much as possible at print speed 1 that is the high-speed print mode. For this reason, in this embodiment, the print processing at print speed 1 is continued until the timing where switching processing of the print speed is essential. In the example shown in FIG. 19A, it is discriminated, based on the discrimination result of the print speed information from the second page (1902) to the 51st page (1904), that the job is formed by sheets with a mixture of print speeds. In this embodiment, even in such a case, sheets before execution of print processing of the 51st page (1904) that are processible only at print speed 2 are processed at print speed 1, like the first page (1901).

FIG. 20A is a view showing required times at print speeds applied to pages at the time of printing and a switching required time in a case where switching of the print speed occurs when print processing according to this embodiment is executed using the conditions shown in FIG. 19A. Note that the conditions such as the print speeds and the switching time are the same as in FIG. 13A.

As shown in FIG. 20A, a medium for which print processing at print speed 1 can be performed is used from the first page to the 50th page, and processing in the high-speed print mode at 100 PPM is performed. The required time at that time is 30.0 sec (required time 1907). However, since the print speed needs to be switched from print speed 1 to print speed 2 before the start of print processing of the 51st page, a switching time of 30 sec is needed (required time

1908). After the elapse of the switching time, print processing of the 51st and subsequent pages is performed at print speed 2, and the required time at that time is 40.0 sec (required time 1909).

FIG. 19B shows another example of information of job page data that forms a job, which is used to explain the processing according to this embodiment. Print speed decision according to this embodiment will be described using the example shown in FIG. 19B. As shown in FIG. 19B, this job is formed by a predetermined number of pages at the top, here, 50 pages using sheets printable only at print speed 2 and pages from the 51st page using sheets processible at print speed 1. The print speed of the job is decided by the processing according to the first embodiment based on the analysis result of the sheet information of the predetermined number of pages, and is decided as print speed 2 in the example shown in FIG. 19B.

After print processing is started, and print processing of the first page (1911) is executed at print speed 2, the print speed is obtained again by the processing according to the first embodiment concerning the range of a new predetermined number of pages, which is obtained by excluding the printed page (first page) from the page of the predetermined number of pages and adding page information next to the predetermined number of pages. In other words, in the example shown in FIG. 19B, the pieces of sheet information of the second page (1912) to the 51st page (1914) are set to the range of the predetermined number of pages, and the print speed information is discriminated.

As shown in FIG. 19B, the range from the second page (1912) to the 51st page (1914) includes both sheets processible only at print speed 2 and sheets processible at print speed 1. In other words, when the sheets of the second page (1912) to the 51st page (1914) are printed, switching processing of the print speed occurs. However, to suppress lowering of the processing speed caused by switching, it is preferable to maintain processing at print speed 2 and switch the print speed to print speed 1 only when it is discriminated that processing at print speed 1 can continuously be performed. In this embodiment, it is possible to obtain the effect of improving productivity by print speed 1 while minimizing the influence of lowering of the processing speed caused by switching.

Assume a stage when print processing progresses, and the output of the 50th page (1913) printed at print speed 2 is ended. The predetermined number of pages at this stage are the 51st page (1914) to the 100th page (1915). All the pages of the predetermined number of pages from the 51st page to the 100th page can be processed at print speed 1. Hence, the pages up to the 50th page are printed at print speed 2, and from the 51st page, a predetermined number of pages or more, for which high-speed processing at print speed 1 can be performed, continue. Hence, in this embodiment, control is performed to switch the print speed to print speed 1 and execute print processing.

FIG. 20B shows required times at print speeds applied to pages at the time of printing and a switching required time in a case where switching of the print speed occurs when print processing according to this embodiment is executed based on the information of job page data shown in FIG. 19B. Note that the conditions such as the print speeds and the switching time are the same as in FIG. 13A. As shown in FIG. 20B, a medium for which print processing can be performed only at print speed 2 is used from the first page to the 50th page, and processing in the low-speed print mode at 75 PPM is performed. The required time at that time is 40.0 sec (required time 1919). From the 51th page, since sheets processible in the high-speed print mode continue for a predetermined number of pages or more, processing can be performed by switching to print speed 1 at 100 PPM (required time 1921). However, a print speed switching time of 30 sec is generated (required time 1920). In the example shown in FIG. 20B, sheets processible at print speed 1 continue more than the predetermined number of pages from the 51st page, productivity improved by print speed 1 is more than a loss caused by the switching time of the print speed, and the productivity of the entire job is expected to improve.

Figure 21:
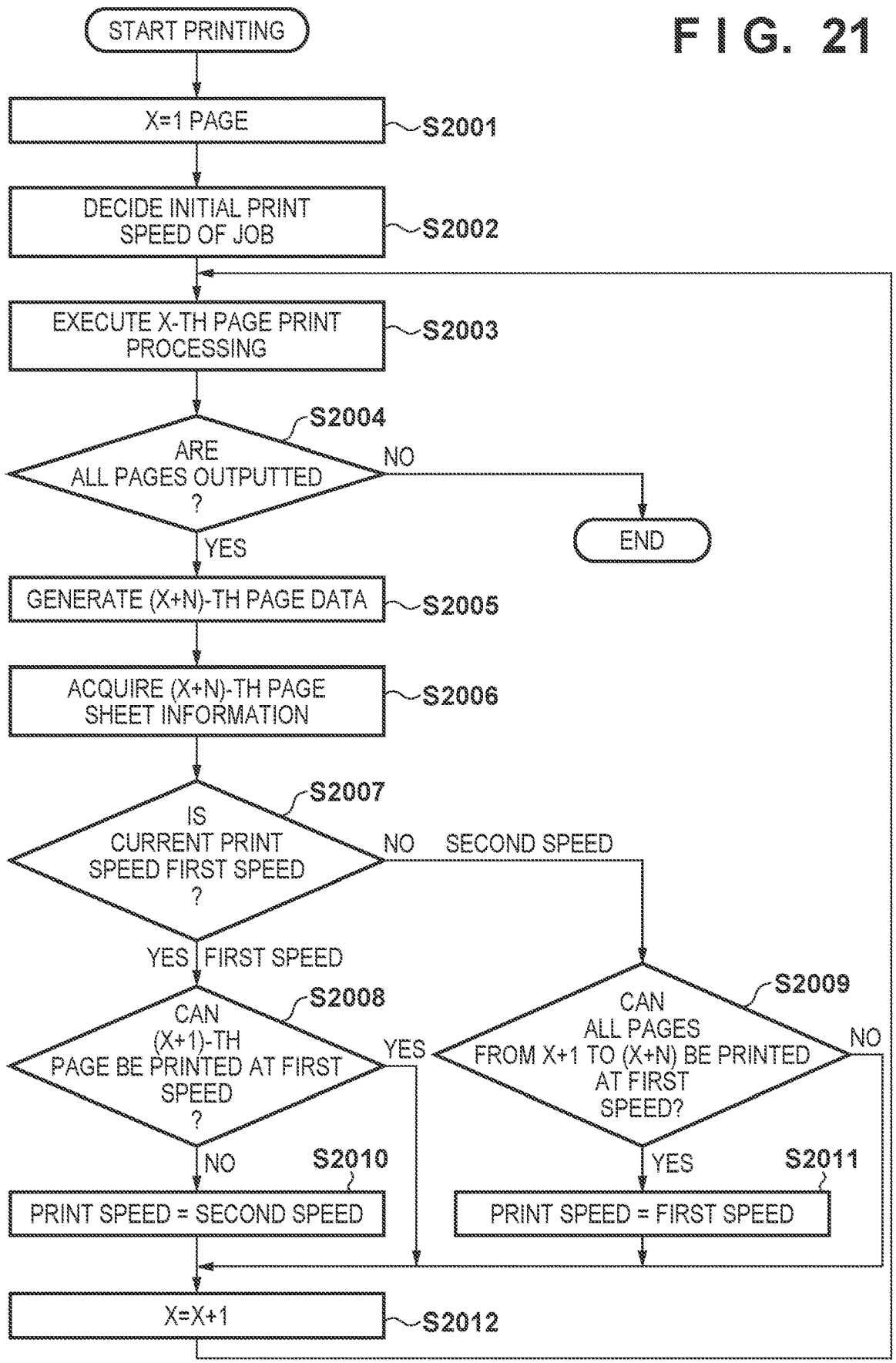
FIG. 21 is a flowchart showing print control processing.

FIG. 21 is a flowchart showing processing of deciding the print speed according to this embodiment. The processing shown in FIG. 21 is implemented by, for example, a controller unit 205 reading out a PDF function program 405 from a ROM 207 and executing it. FIG. 21 shows processing executed in place of steps S1214 to S1218 in FIG. 14. If it is determined in step S1213 that page data and job page data of the predetermined number of pages are accumulated in an HDD 209, the processing shown in FIG. 21 is started. Note that a description will be made below, letting X be a page that is the current print target, and N be the predetermined number of pages concerning the number of pages to be accumulated to discriminate the print speed. The value N is, for example, 50.

In step S2001, the controller unit 205 sets the initial value of the page that is the current print target. Since printing is started from the top page, 1 is set as the initial value. In step S2002, the controller unit 205 decides the initial print speed to be applied in job printing. As the processing of step S2002, the same processing as in step S1214 is performed.

In step S2003, the controller unit 205 applies the print speed decided in step S2002 and executes print processing of the Xth page. After that, in step S2004, the controller unit 205 determines whether the sheet printed in step S2003 is the final page of the job. Here, if it is determined that the sheet is the final page of the job, the processing shown in FIG. 21 is ended. On the other hand, if it is determined that the sheet is not the final page of the job, the process advances to step S2005.

In step S2005, the controller unit 205 generates and accumulates page data of the (X+N)th page that is the page after the predetermined number of pages from the Xth page that is the current printed page. Then, in step S2006, the controller unit 205 acquires sheet information. For example, if the current printed page X is the first page, the (X+N)th page is the 51st page. That is, the print speed is decided using page information from the second page to the 51st page.

In step S2007, the controller unit 205 determines the print speed applied at the time of printing of the Xth page that is the immediately preceding page. If it is determined that the print speed applied at the time of printing of the Xth page is print speed 1, the process advances to step S2008. On the other hand, if it is determined that the print speed applied at the time of printing of the Xth page is print speed 2, the process advances to step S2009 and the subsequent steps.

In step S2008, the controller unit 205 determines whether the top of the unprocessed print pages, that is, the (X+1)th page that is the page to be printed next can be processed at print speed 1. In this embodiment, in step S2008, instead of performing the determination for all of the predetermined number of pages, only the next print target page is the determination target. This is because the print speed selected at the stage of execution of step S2008 is print speed 1, and therefore, print processing can be executed at print speed 1 as long as pages processible at print speed 1 continue. In other words, print processing is executed at print speed 1 until the print speed needs to be switched to print speed 2 to perform the processing.

If it is determined in step S2008 that the (X+1)th page can be processed at print speed 1, to keep the print speed at print speed 1, the process skips step S2010 and advances to step S2012. In step S2012, the controller unit 205 advances the page to be processed next by one and repeats the processing from step S2003.

A case where it is determined in step S2008 that the (X+1)th page cannot be processed at print speed 1 is a case where the (X+1)th page is a page that can be processed only at print speed 2. In this case, in step S2010, the controller unit 205 switches the print speed from print speed 1 to print speed 2. The print speed set in step S2010 is applied when executing print processing of the data of the (X+1) th page in step S2003. Note that if the print speed is switched from print speed 1 to print speed 2 in step S2010, the switching time shown in FIG. 20A is generated.

If it is determined in step S2007 that the print speed applied at the time of printing of the Xth page is print speed 2, the process advances to step S2009. In step S2009, the controller unit 205 determines whether all pages from the (X+1)th page to the (X+N)th page corresponding to the page after the predetermined number of pages can be processed at print speed 1. The purpose of this step is as follows. If print speed 2 is selected, all pages can be processed at print speed 2. If even pages processible at print speed 1 are processed at print speed 2, the capability of the image forming apparatus cannot be exploited fully, but generation of the print speed switching time can reliably be suppressed. In this embodiment, if it is discriminated that pages processible at print speed 1 continue for a predetermined number of pages or more, lowering of the speed caused by print speed switching is permitted, and the advantage of high-speed processing by print speed 1 is enjoyed. Hence, in this embodiment, if the predetermined number of pages or more can be processed at print speed 1 in step S2009, it is determined that the print speed can be switched, and the process advances to step S2011. In step S2011, the controller unit 205 switches the print speed from print speed 2 to print speed 1. The print speed set in this step is applied when executing print processing of the (X+1) th page in step S2003. If it is determined in step S2009 that all pages from the (X+1)th page to the (X+N)th page corresponding to the page after the predetermined number of pages cannot be processed at print speed 1, to keep the print speed at print speed 2, the process skips step S2011 and advances to step S2012. In step S2012, the controller unit 205 advances the page to be processed next by one and repeats the processing from step S2003.

As described above, according to this embodiment, after the print speed is decided based on the predetermined number of pages at the top before the start of printing, print processing can be executed while more optimally deciding the print speed at the time of execution of the print processing based on succeeding unprinted page information.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-109062, filed Jul. 6, 2022, and Japanese Patent Application No. 2022-200510, filed Dec. 15, 2022, that are hereby incorporated by reference herein in their entirety.

What is claimed is:

1. A control apparatus comprising at least one processor and at least a memory having instructions stored thereon, and with the instructions being executed by the at least one processor to act as:
    an acquisition unit configured to analyze a job used to execute print processing and acquire sheet information of a page included in the job; and
    a control unit configured to decide a print speed in the print processing based on information acquired by the acquisition unit and execute the print processing using the decided print speed,
    wherein the control unit causes the acquisition unit to acquire the sheet information of each of a plurality of pages included in the job, decides the print speed based on the acquired information, and executes the print processing using the decided print speed,
    wherein the control unit does not execute the print processing during the acquisition of the sheet information of each of the plurality of pages by the acquisition unit.

2. The apparatus according to claim 1, wherein the control unit decides the print speed in the print processing from a plurality of print speeds including at least a first print speed and a second print speed lower than the first print speed.

3. The apparatus according to claim 2, wherein if pieces of sheet information of all of the pages plurality of pages acquired by the acquisition unit represent that the first print speed is applicable, the control unit decides the first print speed as the print speed in the print processing.

4. The apparatus according to claim 2, wherein if pieces of sheet information of pages corresponding to the plurality of pages acquired by the acquisition unit include sheet information representing that the first print speed is not applicable, the control unit decides the second print speed as the print speed in the print processing.

5. The apparatus according to claim 2, wherein
the plurality of print speeds include a third print speed lower than the second print speed, and
the control unit decides the print speed in the print processing based on at least one of a result of a first determination of determining whether pieces of sheet information of all of the plurality of pages acquired by the acquisition unit represent that the first print speed is applicable, a result of a second determination of determining whether the pieces of sheet information of all of the plurality of pages acquired by the acquisition unit represent that the second print speed is applicable, and a result of a third determination of determining whether the pieces of sheet information of all of the plurality of pages acquired by the acquisition unit represent that the third print speed is applicable.

6. The apparatus according to claim 5, wherein
if, as the result of the first determination, the pieces of sheet information of all of the plurality of pages acquired by the acquisition unit represent that the first print speed is applicable, the control unit decides the first print speed as the print speed in the print processing, and
if pieces of sheet information of pages corresponding to the plurality of pages acquired by the acquisition unit include sheet information representing that the first print speed is not applicable, the control unit performs the second determination.

7. The apparatus according to claim 6, wherein
if, as the result of the second determination, the pieces of sheet information of all of the plurality of pages acquired by the acquisition unit represent that the second print speed is applicable, the control unit decides the second print speed as the print speed in the print processing, and
if the pieces of sheet information of the pages corresponding to the plurality of pages acquired by the acquisition unit include sheet information representing that the second print speed is not applicable, the control unit performs the third determination.

8. The apparatus according to claim 7, wherein
if, as the result of the third determination, the pieces of sheet information of all of the plurality of pages acquired by the acquisition unit represent that the third print speed is applicable, the control unit decides the third print speed as the print speed in the print processing, and
if the pieces of sheet information of the pages corresponding to the plurality of pages acquired by the acquisition unit include sheet information representing that the third print speed is not applicable, the control unit decides a predetermined print speed as the print speed in the print processing.

9. The apparatus according to claim 2, wherein in a case where an acceptance unit accepts a designation of a predetermined mode for executing the job, the control unit causes the acquisition unit to acquire the sheet information of each of the plurality of pages, accumulates the sheet information in the storage unit, decides the print speed in the print processing based on the accumulated result, and executes the print processing using the decided print speed.

10. The apparatus according to claim 9, wherein in a case where the acceptance unit does not accept the designation of the predetermined mode, the control unit causes the acquisition unit to acquire the sheet information of one page included in the plurality of pages, decides a print speed corresponding to the acquired result, and executes the print processing using the decided print speed, and
the control unit repeats processing from the acquisition of the sheet information of the one page to the execution of the print processing using the decided print speed as many times as the number of the plurality of pages.

11. The apparatus according to claim 9, wherein the predetermined mode is a mode in which productivity is preferred.

12. The apparatus according to claim 10, wherein the case where the acceptance unit does not accept the designation of the predetermined mode includes a case where the acceptance unit accepts a designation of a mode in which quality is preferred.

13. The apparatus according to claim 1, wherein
the control unit decides a print speed corresponding to the sheet information of each of the plurality of pages concurrently with the acquisition of the sheet information of each of the plurality of pages by the acquisition unit and an accumulation of the sheet information in a storage unit, and executes the print processing using the print speed decided for each page, and
after the print processing of the plurality of pages, the control unit decides the print speed based on the result accumulated in the storage unit, and executes print processing following the plurality of pages using the decided print speed.

14. The apparatus according to claim 1, wherein the plurality of pages is decided such that a time of accumulating the sheet information in a storage unit becomes shorter than a time for switching the print speed.

15. The apparatus according to claim 1, wherein the sheet information includes a type of a sheet.

16. The apparatus according to claim 15, wherein the control unit decides the print speed in the print processing based on information that associates the type of the sheet and with applicability of the print speed.

17. The apparatus according to claim 1, further comprising a print unit configured to perform printing for a sheet by executing the print processing.

18. The apparatus according to claim 1, wherein the control unit causes the acquisition unit to acquire sheet information of each of a predetermined number of pages from a top page of unprinted pages in as the plurality of pages included in the job, accumulates the sheet information in the a storage unit, decides the print speed based on the accumulated result, and executes the print processing using the decided print speed.

19. The apparatus according to claim 18, wherein if the print speed in immediately preceding print processing is a first print speed, the control unit decides the print speed of a next page based on the sheet information of the top page of the unprinted pages.

20. The apparatus according to claim 19, wherein if the print speed in immediately preceding print processing is a second print speed lower than the first print speed, the control unit decides the print speed of the next page based on the sheet information of the predetermined number of pages from the top page of the unprinted pages.

21. A control method comprising:
analyzing a job used to execute print processing and acquiring sheet information of a page included in the job; and
deciding a print speed in the print processing based on the acquired information and executing the print processing using the decided print speed, wherein the sheet information of each of a plurality of pages included in the job is acquired, the print speed is decided based on the acquired information and the print processing is executed using the decided print speed, wherein the print processing is not executed during the acquisition of the sheet information of each of the plurality of pages.

22. A non-transitory computer-readable storage medium storing a program configured to cause a computer of an information processing apparatus to function to:

analyze a job used to execute print processing and acquire sheet information of a page included in the job; and decide a print speed in the print processing based on the acquired information and execute the print processing using the decided print speed, wherein the sheet information of each of a plurality of pages included in the job is acquired, the print speed is decided based on the acquired information, and the print processing is executed using the decided print speed, wherein the print processing is not executed during the acquisition of the sheet information of each of the plurality of pages.

* * * * *